United States Patent
Fischer et al.

(10) Patent No.: US 11,976,524 B2
(45) Date of Patent: May 7, 2024

(54) PARAMETER MONITORING AND CONTROL FOR AN ELECTRIC DRIVEN HYDRAULIC FRACKING SYSTEM

(71) Applicant: Halliburton Energy Services, Inc., Houston, TX (US)

(72) Inventors: John Fischer, Hempstead, TX (US); John J. Crosetto, Oak Forest, IL (US); David Kubricht, Cypress, TX (US); Richard Cheatham, Houston, TX (US); Jeffrey Pollack, Joliet, IL (US); Chad Lawman, Joliet, IL (US); David Todd, Houston, TX (US); Tyler Nolen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/226,002

(22) Filed: Jul. 25, 2023

(65) Prior Publication Data
US 2023/0366280 A1    Nov. 16, 2023

Related U.S. Application Data

(63) Continuation of application No. 17/968,055, filed on Oct. 18, 2022, now Pat. No. 11,708,733, which is a
(Continued)

(51) Int. Cl.
*H02K 7/18* (2006.01)
*E21B 4/04* (2006.01)
(Continued)

(52) U.S. Cl.
CPC ............... *E21B 21/08* (2013.01); *E21B 4/04* (2013.01); *E21B 7/022* (2013.01);
(Continued)

(58) Field of Classification Search
CPC ....... H02B 1/52; H02B 5/00; H02J 13/00036; H02K 7/18; H02P 27/04
See application file for complete search history.

(56) References Cited

U.S. PATENT DOCUMENTS

| 3,075,136 A | 1/1963 | Jones |
| 3,262,036 A | 7/1966 | Clarke |

(Continued)

FOREIGN PATENT DOCUMENTS

| CA | 2773843 C | 1/2016 |
| CA | 2707269 C | 8/2018 |

(Continued)

OTHER PUBLICATIONS

Roethemeyer, D., and D. Yankaskas. "Evolution of motor and variable frequency drive technology." ACEEE Summer Study Proceedings on Energy Efficiency in Industry. 1995.
(Continued)

*Primary Examiner* — Muhammad S Islam
(74) *Attorney, Agent, or Firm* — Conley Rose, P.C.; Rodney B. Carroll

(57) ABSTRACT

An electric driven hydraulic fracking system is disclosed. A pump configuration includes the single VFD, the single shaft electric motor, and the single hydraulic pump mounted on the single pump trailer. A controller associated with the single VFD and is mounted on the single pump trailer. The controller monitors operation parameters associated with an operation of the electric driven hydraulic fracking system as each component of the electric driven hydraulic fracking system operates to determine whether the operation parameters deviate beyond a corresponding operation parameter threshold. Each of the operation parameters provides an indicator as to an operation status of a corresponding component of the electric driven hydraulic fracking system. The controller initiates corrected actions when each operation
(Continued)

parameter deviates beyond the corresponding operation threshold. Initiating the corrected actions when each operation parameter deviates beyond the corresponding operation threshold maintains the operation of the electric driven hydraulic fracking system.

20 Claims, 6 Drawing Sheets

Related U.S. Application Data continuation of application No. 17/707,840, filed on Mar. 29, 2022, now Pat. No. 11,473,381, which is a continuation of application No. 17/511,078, filed on Oct. 26, 2021, now Pat. No. 11,286,736, which is a continuation of application No. 17/234,689, filed on Apr. 19, 2021, now Pat. No. 11,156,044, which is a continuation of application No. 17/129,719, filed on Dec. 21, 2020, now Pat. No. 10,982,498, which is a continuation of application No. 16/927,487, filed on Jul. 13, 2020, now Pat. No. 10,871,045, which is a continuation of application No. 16/791,256, filed on Feb. 14, 2020, now Pat. No. 10,753,165.

(60) Provisional application No. 62/805,521, filed on Feb. 14, 2019.

(51) Int. Cl.
| | | |
|---|---|---|
| *E21B 7/02* | (2006.01) | |
| *E21B 21/08* | (2006.01) | |
| *E21B 43/26* | (2006.01) | |
| *F04B 17/03* | (2006.01) | |
| *F04B 17/06* | (2006.01) | |
| *F04D 13/06* | (2006.01) | |
| *H02B 1/52* | (2006.01) | |
| *H02B 5/00* | (2006.01) | |
| *H02J 13/00* | (2006.01) | |
| *H02P 27/04* | (2016.01) | |
| *E21B 4/02* | (2006.01) | |

(52) U.S. Cl.
CPC ...... *E21B 43/2605* (2020.05); *E21B 43/2607* (2020.05); *F04B 17/03* (2013.01); *F04B 17/06* (2013.01); *F04D 13/0686* (2013.01); *H02B 1/52* (2013.01); *H02B 5/00* (2013.01); *H02J 13/00036* (2020.01); *H02K 7/18* (2013.01); *H02P 27/04* (2013.01); *E21B 4/02* (2013.01); *F05B 2220/706* (2013.01); *F05B 2240/941* (2013.01)

(56) References Cited

U.S. PATENT DOCUMENTS

| | | |
|---|---|---|
| 3,911,677 A | 10/1975 | Collins |
| 4,031,702 A | 6/1977 | Burnett et al. |
| 5,712,802 A | 1/1998 | Kumar |
| 5,795,135 A | 8/1998 | Nyilas et al. |
| 5,865,247 A | 2/1999 | Paterson et al. |
| 6,109,372 A | 8/2000 | Dorel et al. |
| 6,116,040 A | 9/2000 | Stark |
| 6,129,529 A | 10/2000 | Young et al. |
| 6,167,965 B1 | 1/2001 | Bearden |
| 6,271,637 B1 | 8/2001 | Kushion |
| 7,053,568 B2 | 5/2006 | Rudinec |
| 7,092,771 B2 | 8/2006 | Retlich et al. |
| 7,170,262 B2 | 1/2007 | Pettigrew |
| 7,309,835 B2 | 12/2007 | Morrison |
| 7,312,593 B1 | 12/2007 | Streicher |
| 7,494,263 B2 | 2/2009 | Dykstra |
| 7,539,549 B1 | 5/2009 | Discenzo et al. |
| 7,717,193 B2 | 5/2010 | Egilsson |
| 7,836,949 B2 | 11/2010 | Dykstra |
| 7,841,394 B2 | 11/2010 | McNeel |
| 7,949,483 B2 | 5/2011 | Discenzo |
| 8,056,635 B2 | 11/2011 | Shampine et al. |
| 8,106,527 B1 | 1/2012 | Carr |
| 8,155,922 B2 | 4/2012 | Loucks |
| 8,174,853 B2 | 5/2012 | Kane |
| 8,379,424 B2 | 2/2013 | Grbovic |
| 8,400,093 B2 | 3/2013 | Knox et al. |
| 8,503,180 B2 | 8/2013 | Nojima |
| 8,789,601 B2 | 7/2014 | Broussard |
| 8,874,383 B2 | 10/2014 | Gambier |
| 8,997,904 B2 | 4/2015 | Cryer |
| 9,140,110 B2 | 9/2015 | Coli |
| 9,366,114 B2 | 6/2016 | Coli et al. |
| 9,410,410 B2 | 8/2016 | Broussard |
| 9,450,385 B2 | 9/2016 | Kristensen |
| 9,475,020 B2 | 10/2016 | Coli et al. |
| 9,534,473 B2 | 1/2017 | Morris |
| 9,556,721 B2 | 1/2017 | Jang et al. |
| 9,611,728 B2 | 4/2017 | Oehring |
| 9,650,871 B2 | 5/2017 | Oehring |
| 9,650,879 B2 | 5/2017 | Broussard et al. |
| 9,745,840 B2 | 8/2017 | Oehring |
| 9,777,723 B2 | 10/2017 | Wiegman et al. |
| 9,840,901 B2 | 12/2017 | Oehring |
| 9,893,500 B2 | 2/2018 | Oehring |
| 9,970,278 B2 | 5/2018 | Broussard |
| 10,020,711 B2 | 7/2018 | Oehring |
| 10,119,381 B2 | 11/2018 | Oehring |
| 10,227,854 B2 | 3/2019 | Glass et al. |
| 10,254,732 B2 | 4/2019 | Oehring |
| 10,280,724 B2 | 5/2019 | Hinderliter |
| 10,337,308 B2 | 7/2019 | Broussard |
| 10,408,031 B2 | 9/2019 | Oehring |
| 10,519,730 B2 | 12/2019 | Morris et al. |
| 10,526,882 B2 | 1/2020 | Oehring |
| 10,648,311 B2 | 5/2020 | Oehring |
| 10,934,824 B2 | 3/2021 | Oehring |
| 11,091,992 B2 | 8/2021 | Broussard |
| 11,136,870 B2 | 10/2021 | Broussard |
| 2003/0057704 A1 | 3/2003 | Baten |
| 2005/0116541 A1 | 6/2005 | Seiver |
| 2006/0260331 A1 | 11/2006 | Andreychuk |
| 2007/0125544 A1 | 6/2007 | Robinson |
| 2007/0201305 A1 | 8/2007 | Heilman |
| 2008/0029267 A1 | 2/2008 | Shampine |
| 2008/0083222 A1 | 4/2008 | Hubert |
| 2008/0137266 A1 | 6/2008 | Jensen |
| 2008/0264625 A1 | 10/2008 | Ochoa |
| 2008/0288115 A1 | 11/2008 | Rusnak |
| 2009/0122578 A1 | 5/2009 | Beltran |
| 2010/0310384 A1 | 12/2010 | Stephenson |
| 2010/0312415 A1 | 12/2010 | Loucks |
| 2011/0061855 A1 | 3/2011 | Case |
| 2011/0063942 A1 | 3/2011 | Hagan |
| 2011/0194256 A1 | 8/2011 | De Rijck |
| 2011/0241590 A1 | 10/2011 | Horikoshi |
| 2012/0085541 A1 | 4/2012 | Love |
| 2012/0112757 A1 | 5/2012 | Vrankovic |
| 2012/0217067 A1 | 8/2012 | Mebane, III et al. |
| 2012/0223524 A1* | 9/2012 | Williams ............... H02J 5/00 |
| | | 290/50 |
| 2012/0224977 A1 | 9/2012 | Sotz et al. |
| 2012/0255734 A1 | 10/2012 | Coli |
| 2013/0030438 A1 | 1/2013 | Fox |
| 2013/0306322 A1 | 11/2013 | Sanborn |
| 2014/0012416 A1 | 1/2014 | Negishi et al. |
| 2014/0062088 A1 | 3/2014 | Carr |
| 2014/0077607 A1 | 3/2014 | Clarke |
| 2015/0001161 A1 | 1/2015 | Wiemers |
| 2015/0027712 A1 | 1/2015 | Vicknair |
| 2015/0114652 A1 | 4/2015 | Lestz |
| 2015/0144336 A1 | 5/2015 | Hardin |
| 2015/0252661 A1 | 9/2015 | Glass |
| 2016/0006222 A1* | 1/2016 | Warren ............... H01R 4/66 |
| | | 174/6 |

(56) References Cited

U.S. PATENT DOCUMENTS

| | | |
|---|---|---|
| 2016/0025826 A1 | 1/2016 | Taicher |
| 2016/0195082 A1 | 7/2016 | Wiegman et al. |
| 2016/0258267 A1 | 9/2016 | Payne |
| 2016/0290114 A1 | 10/2016 | Oehring |
| 2016/0326854 A1 | 11/2016 | Broussard et al. |
| 2016/0326855 A1 | 11/2016 | Coli et al. |
| 2016/0369609 A1 | 12/2016 | Morris et al. |
| 2017/0051732 A1* | 2/2017 | Hernandez ............ F04B 17/06 |
| 2017/0226842 A1 | 8/2017 | Omont |
| 2018/0101502 A1 | 4/2018 | Nassif et al. |
| 2018/0112468 A1 | 4/2018 | Savage et al. |
| 2018/0258746 A1 | 9/2018 | Broussard et al. |
| 2019/0293063 A1 | 9/2019 | Scott |
| 2020/0300073 A1 | 9/2020 | Hinderliter et al. |
| 2020/0340313 A1 | 10/2020 | Fischer et al. |

FOREIGN PATENT DOCUMENTS

| | | |
|---|---|---|
| CN | 202463670 U | 10/2012 |
| WO | 2014116761 A1 | 7/2014 |
| WO | 2014177346 A1 | 11/2014 |
| WO | 2016148715 A1 | 9/2016 |

OTHER PUBLICATIONS

Dewinter, Frank A., and B. J. Kedrosky. "The application of a 3500 HP variable frequency drive for pipeline pump control." IEEE Transactions on Industry Applications 25.6 (1989): 1019-1024.

Discenzo, Fred M., et al. "Next generation pump systems enable new opportunities for asset management and economic optimization." Proceedings of the 19th International Pump Users Symposium. Texas A&M University. Turbomachinery Laboratories, 2002.

Hefner, Allen R. "A dynamic electro-thermal model for the IGBT." IEEE Transactions on Industry Applications 30.2 (1994): 394-405.

Hickok, Herbert N. "Adjustable speed—A tool for saving energy losses in pumps, fans, blowers, and compressors." IEEE Transactions on Industry Applications 1 (1985): 124-136.

Irvine, Geoff, and Ian H. Gibson. "The use of variable frequency drives as a final control element in the petroleum industry." Conference Record of the 2000 IEEE Industry Applications Conference. Thirty-Fifth IAS Annual Meeting and World Conference on Industrial Applications of Electrical Energy (Cat. No. 00CH37129). vol. 4. IEEE, 2000.

Iversen, Arthur H., and Stephen Whitaker. "A uniform temperature, ultra-high heat flux liquid-cooled, power semiconductor package." IEEE transactions on industry applications 27.1 (1991): 85-92.

Lockley, Bill, et al. "IEEE Std 1566—The Need for a Large Adjustable Speed Drive Standard." 2006 Record of Conference Papers—IEEE Industry Applications Society 53rd Annual Petroleum and Chemical Industry Conference. IEEE, 2006.

Hanna, Robert A., and Shiva Prabhu. "Medium-voltage adjustable-speed drives-users' and manufacturers' experiences." IEEE transactions on industry applications 33.6 (1997): 1407-1415.

Perrin, Martin, et al. "Induction motors, reciprocating compressors and variable frequency drives." Record of Conference Papers. IEEE Industry Applications Society 44th Annual Petroleum and Chemical Industry Conference. IEEE, 1997.

Shepherd, William, and Jack Stanway. "Unbalanced voltage control of 3-phase loads by the triggering of silicon controlled rectifiers." IEEE Transactions on Industry and General Applications 3 (1965): 206-216.

Saidur, Rahman, et al. "Applications of variable speed drive (VSD) in electrical motors energy savings." Renewable and sustainable energy reviews 16.1 (2012): 543-550.

"Drive Systems: Power On Demand." Comprehensive Power, Drive Systems, Comprehensive Power Inc., web.archive.org/web/20081205001529/http://www.comprehensivepower.com/drive_systems.htm. Accessed Dec. 5, 2008.

TMEIC Corporation "TMEIC Industrial Motors" Product Brochure M-1201 B 2015, https://www.tmeic.com/Repository/Others/Industrial%20Motor%20Brochure-rev%20Sep2015-lo%20res.pdf Accessed Nov. 10, 2023.

Integrated Power Services "Toshiba Drives." Industrial Electronic Sales, www.ipsrpd.com/toshiba-drives.html. Accessed Nov. 10, 2023.

Asea Brown Boveri "ABB drives in power generation" 2011 https://search.abb.com/library/Download.aspx?DocumentID=3BHT%20490%20510%20R0001&LanguageCode=en&DocumentPartId=&Action=Launch Accessed Nov. 10, 2023.

Toshiba Motors & Drives "G9 Adjustable Speed Drives" Toshiba International Corporation 2020, 6 pages, https://www.toshiba.com/tic/datafiles/brochures/G9_6pg_ESSENCE_110419_nocrop.pdf. Accessed Nov. 10, 2023.

Toshiba Motors & Drives "H9 Adjustable Speed Drive" Toshiba International Corporation 2011 287 pages, https://pim.galco.com/Manufacturer/Toshiba/TechDocument/Operation%20Manual/driv_ac_h9_opm.pdf. Accessed Nov. 10, 2023.

Toshiba Motors & Drives "2011 Industrial Catalog" Toshiba International Corporation 2011 272 pages, https://esrmotors.com/Literature/Toshiba/VFDs/Catalogs/2011%20Industrial%20ASD%20PAC%20Pricebook_Apr-25-2011-small.pdf. Accessed Nov. 10, 2023.

National Electrical Manufacturers Association "Adjustable Speed Electrical Power Drive Systems: Part 4: General Requirements—Rating Specifications for A.C. Power Drive Systems Above 1000 V A.C. and not Exceeding 35 kV" https://web.archive.org/web/20060114093828/http://www.nema.org/stds/61800-4.cfm . Accessed Nov. 10, 2023.

\* cited by examiner

PARAMETER MONITORING AND CONTROL FOR AN ELECTRIC DRIVEN HYDRAULIC FRACKING SYSTEM

CROSS-REFERENCE TO RELATED APPLICATIONS

The present application is a continuation application of U.S. Nonprovisional application Ser. No. 17/968,055 filed on Oct. 18, 2022 which is a continuation of U.S. Nonprovisional application Ser. No. 17/707,840 filed on Mar. 29, 2022 which issued as U.S. Pat. No. 11,473,381 on Oct. 18, 2022 which is a continuation of U.S. Nonprovisional application Ser. No. 17/511,078 filed on Oct. 26, 2021 which issued as U.S. Pat. No. 11,286,736 on Mar. 29, 2022 which is a continuation application of U.S. Nonprovisional application Ser. No. 17/234,689 filed on Apr. 19, 2021 which issued as U.S. Pat. No. 11,156,044 on Oct. 26, 2021 which is a continuation application of U.S. Nonprovisional application Ser. No. 17/129,719 filed on Dec. 21, 2020 which issued as U.S. Pat. No. 10,982,498 on Apr. 20, 2021 which is a continuation application of U.S. Nonprovisional application Ser. No. 16/927,487 filed on Jul. 13, 2020 which issued as U.S. Pat. No. 10,871,045 on Dec. 22, 2020 which is a continuation of U.S. Nonprovisional application Ser. No. 16/791,256 filed on Feb. 14, 2020 which issued as U.S. Pat. No. 10,753,165 on Feb. 14, 2020, which claims the benefit of U.S. Provisional Application No. 62/805,521 filed on Feb. 14, 2019, which are incorporated herein by reference in their entirety. This application also incorporates U.S. Nonprovisional application Ser. No. 16/790,392 herein by reference in its entirety. This application also incorporates U.S. Nonprovisional application Ser. No. 16/790,538. This application also incorporates U.S. Nonprovisional application Ser. No. 16/790,581 herein by reference in its entirety.

BACKGROUND

Field of Disclosure

The present disclosure generally relates to electric driven hydraulic fracking systems and specifically to a single Variable Frequency Drive (VFD), a single shaft electric motor, and a single hydraulic pump positioned on a single pump trailer.

Related Art

Conventional hydraulic fracking systems are diesel powered in that several different diesel engines apply the power to the hydraulic pumps as well as several types of auxiliary systems that assist the hydraulic pumps to execute the fracking, such as hydraulic coolers and lube pumps. Conventional diesel powered hydraulic fracking systems require a diesel engine and a transmission to be connected to a hydraulic pump to drive the hydraulic pump. However, typically several hydraulic pumps are required at a single fracking site to prepare the well for the later extraction of the fluid, such as hydrocarbons, from the existing well. Thus, each of the several hydraulic pumps positioned at a single fracking site require a single diesel engine and single transmission to adequately drive the corresponding hydraulic pump requiring several diesel engines and transmissions to also be positioned at the single fracking site in addition to the several hydraulic pumps.

Typically, the diesel engines limit the horsepower (HP) that the hydraulic pumps may operate thereby requiring an increased quantity of hydraulic pumps to attain the required HP necessary prepare the well for the later extraction of fluid, such as hydrocarbons, from the existing well. Any increase in the power rating of hydraulic pumps also results in an increase in the power rating of diesel engines and transmissions required at the fracking site as each hydraulic pump requires a sufficiently rated diesel engine and transmission. As the diesel engines, transmissions, and hydraulic pumps for a single fracking site increase, so does quantity of trailers required to transport and position configurations at the fracking site.

The numerous diesel engines, transmissions, and hydraulic pumps required at a fracking site significantly drives up the cost of the fracking operation. Each of the numerous trailers required to transport and position configurations require CDL drivers to operate as well as increased manpower to rig the increased assets positioned at the fracking site and may be classified as loads in need of permits, thus adding expense and possible delays. The amount of diesel fuel required to power the numerous diesel engines to drive the numerous hydraulic pumps required to prepare the well for the later extraction of the fluid, such as hydrocarbons, from the existing well also significantly drives up the cost of the fracking operation. Further, the parasitic losses typically occur as the diesel engines drive the hydraulic pumps as well as drive the auxiliary systems. Such parasitic losses actually decrease the amount of HP that is available for the hydraulic pumps operate thereby significantly decreasing the productivity of hydraulic pumps. In doing so, the duration of the fracking operation is extended resulting in significant increases in the cost of the fracking operation. The diesel engines also significantly increase the noise levels of the fracking operation and may have difficulty operating within required air quality limits.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

Figure 5:
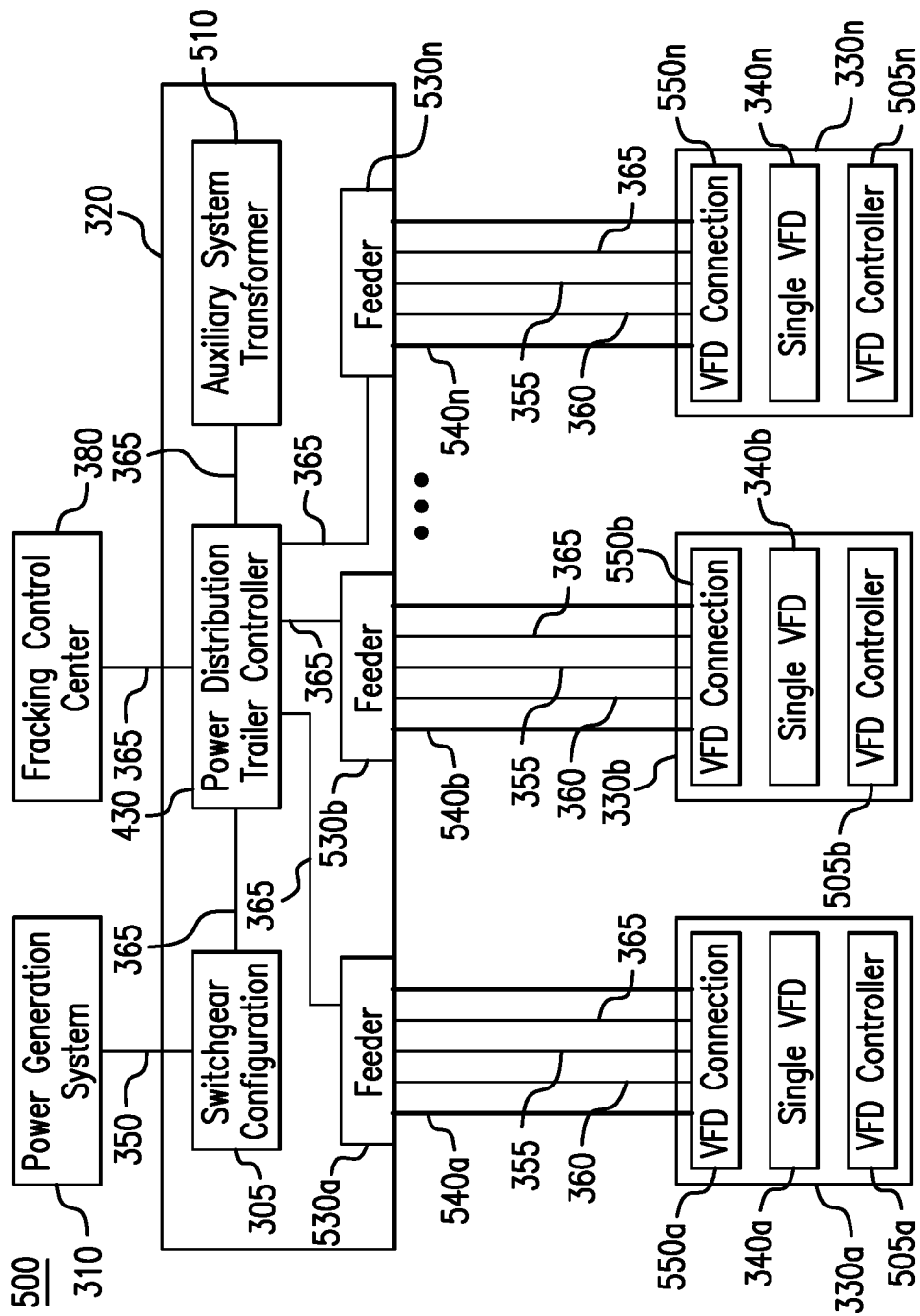
Figure 6:
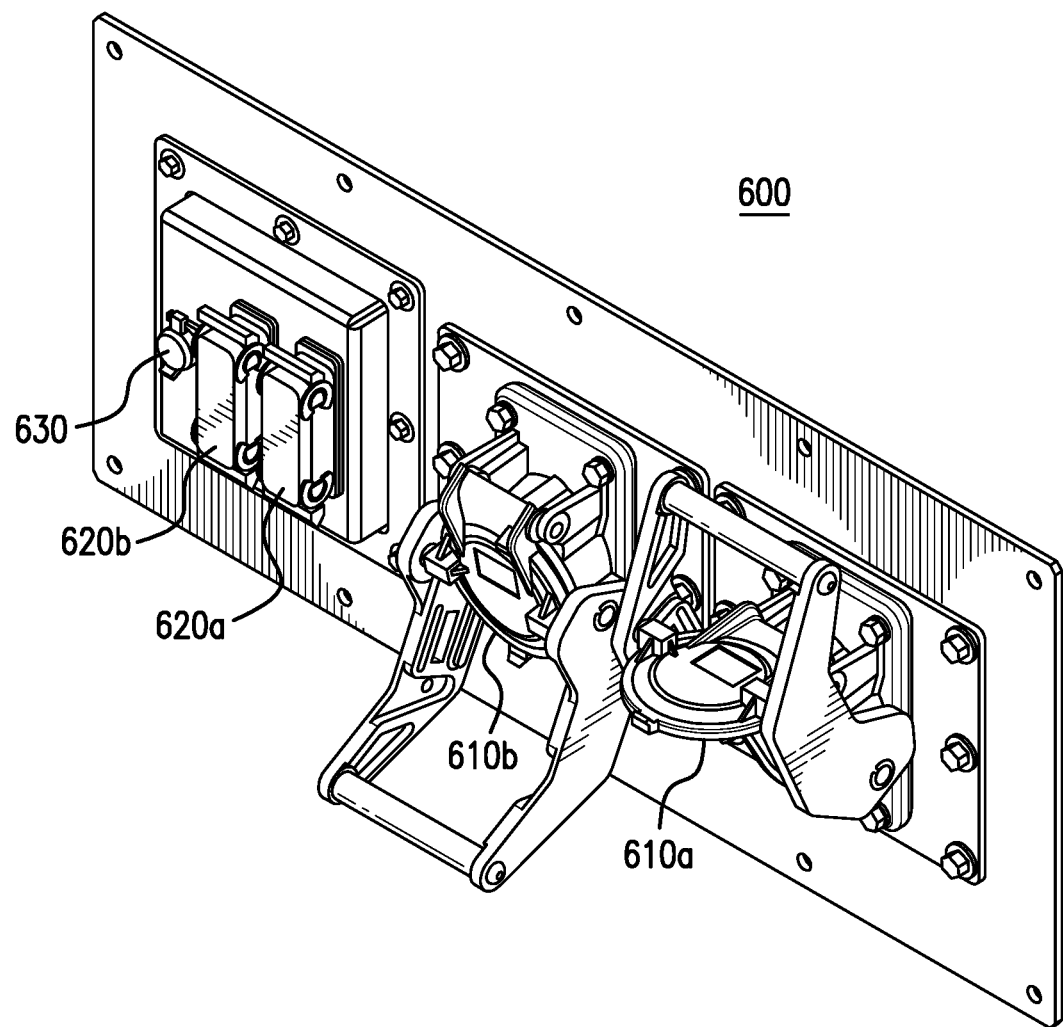

FIG. 5 illustrates a block diagram of an electric driven hydraulic fracking system that further describes the interaction between the power distribution trailer and the VFD controllers; and FIG. 6 illustrates a top-elevational view of a connector configuration for each of the components of the electric driven hydraulic fracking system that may couple to a medium voltage cable, a low voltage cable, and a communication cable.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

System Overview

Figure 1:
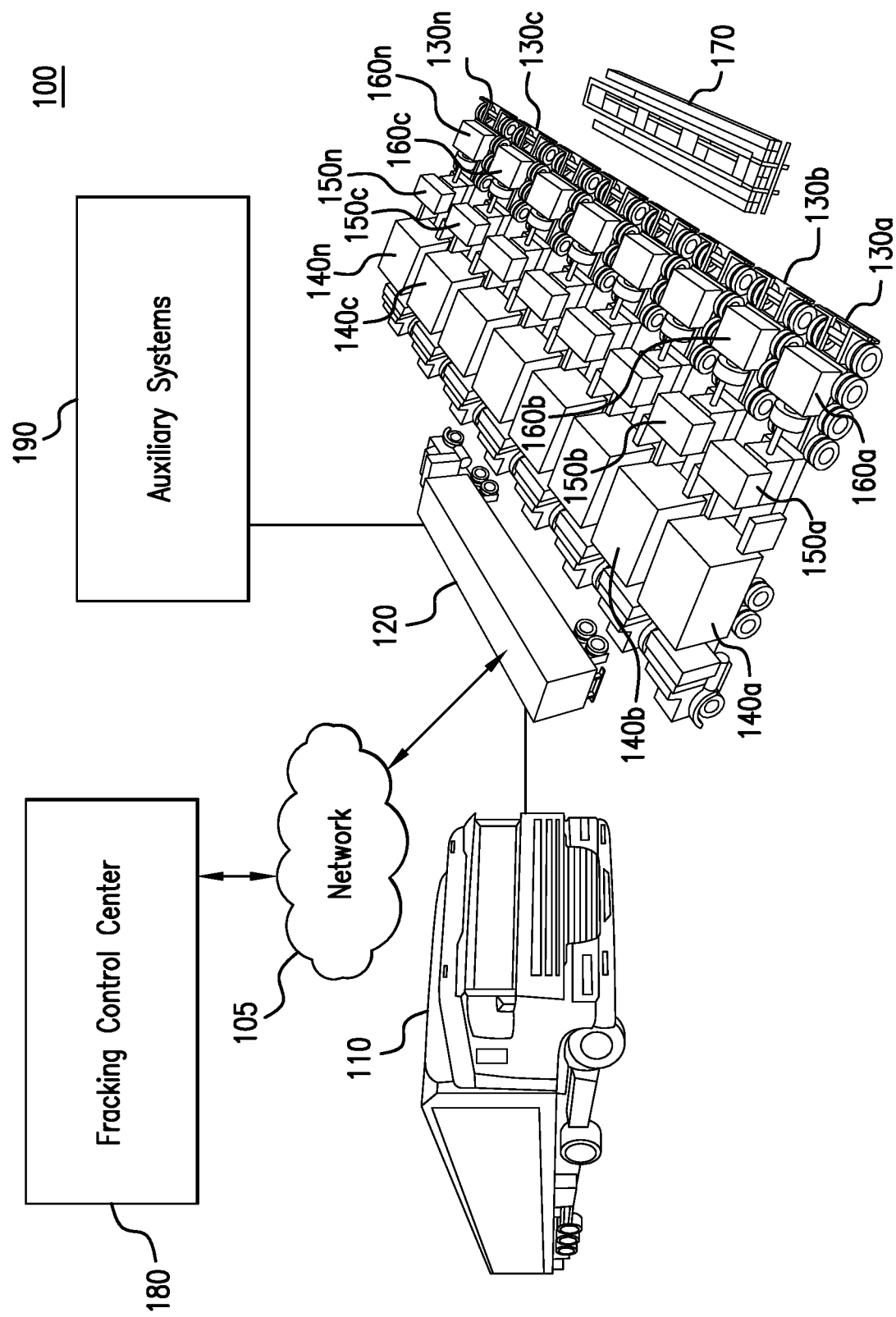
FIG. 1 illustrates a top-elevational view of a hydraulic fracking operation such that the hydraulic pumps may pump a fracking media into a well to execute a fracking operation to extract a fluid from the well.

FIG. 1 illustrates a top-elevational view of a hydraulic fracking operation such that the hydraulic pumps may pump a fracking media into a well to execute a fracking operation to extract a fluid from the well. A hydraulic fracking operation 100 includes a fracking trailer 170 that a fracking configuration may be deployed. The fracking configuration may be the fracking equipment that executes the actual fracking to prepare the well for the later extraction of the fluid from the well. For example, the fracking trailer 170 may include the fracking equipment that implements the missile as well as the well heads that are affixed onto the well and distribute the fracking media into the well to prepare the well for later extraction of the fluid from the well. The fluid extracted from the well may include a liquid, such as crude oil, and so on, or a gas, such as such as hydrocarbons, natural gas and so on, that is extracted from the well that is then stored and distributed.

The power that is generated to provide power to each of the numerous components included in the hydraulic fracking operation 100 is positioned on a power generation system 110. Often times, the fracking site is a remote site where it has been determined that sufficient fluid has been located underground to justify temporarily establishing the hydraulic fracking operation 100 for a period of time to drill the well and extract the fluid from the well. Such fracking sites are often times positioned in remote locations such as uninhabited areas in mountainous regions with limited road access to the fracking sites such that the hydraulic fracking operation 100 is often times a mobile operation where each of the components are positioned on trailers that are then hauled to the fracking site via semi-trucks and/or tractors. For example, the fracking trailer 170 includes the fracking equipment which is hauled in via a semi-truck and is positioned closest to the well as compared to the other components in order to execute the fracking operation.

In another example, the power generation system 110 may also be a mobile operation such that the power generation equipment may be mounted on a power generation trailer and transported to the fracking site via a semi-truck and/or tractor. The power generation system 110 may be positioned on the fracking site such that any component of the hydraulic fracking operation 100 may be powered by the power generation system 110. In doing so, the power required for the hydraulic fracking operation 100 may be consolidated to the power generation system 110 such that the power generation system 110 provides the necessary power required for the hydraulic fracking operation 100. Thus, the power generation system 110 may be positioned at the fracking site in a manner such that each component of the hydraulic fracking operation 100 may have power distributed from the power generation system 110 to each respective component of the hydraulic fracking operation 100.

The power generation system 110 may include power generation systems that generate electric power such that the hydraulic fracking operation 100 is powered via electric power generated by the power generation system 110 and does not require subsidiary power generation systems such as subsidiary power generation systems that include diesel engines. In doing so, the power generation system 110 may provide electric power to each component of the hydraulic fracking operation 100 such that the hydraulic fracking operation 100 is solely powered by electric power generated by the power generation system 110. The power generation system 110 may consolidate the electric power that is generated for the electric driven hydraulic fracking system 100 such that the quantity and size of power sources included in the power generation system 110 is decreased.

The power sources are included in the power generation system 110 and output electric power such that the electric power outputted from each power source included in the power generation system 110 is collectively accumulated to be electric power at a power generation voltage level as will be discussed in detail below. For example, the power output for each of the power sources included in the power generation system 110 may be paralleled to generate the electric power at the power generation voltage level. The power generation system 110 may include numerous power sources as well as different power sources and any combination thereof. For example, the power generation system may include power sources that include a quantity of gas turbine engines. In another example, the power generation system 110 may include a power source that includes an electric power plant that independently generates electric power for an electric utility grid. In another example, the power generation system 110 may include a combination of gas turbine engines and an electric power plant. The power generation system 110 may generate the electric power at a power level and a voltage level.

The power generation system 110 may generate electric power at a power generation voltage level in which the power generation voltage level is the voltage level that the power generation system is capable of generating the electric power. For example, the power generation system 110 when the power sources of the power generation system 110 include a quantity of gas turbine engines may generate the electric power at the power generation voltage level of 13.8 kV which is a typical voltage level for electric power generated by gas turbine engines. In another example, the power generation system 110 when the power sources of the power generation system include an electric power plan may generate the electric power at the power generation voltage level of 12.47 kV which is a typical voltage level for electric power generated by an electric power plant.

In another example, the power generation system 110 may generate electric power that is already at a VFD voltage level to power the single shaft electric motor 150(a-n) as discussed in detail below. In such an example, the power generation system 110 may generate the electric power that is already at the VFD voltage level of 4160V. In another example, the power generation system 110 may generate the electric power at the power generation voltage level at a range of 4160V to 15 kV. In another example, the power generation system 110 may generate electric power at the power generation voltage level of up to 38 kV. The power generation system 110 may generate the electric power at any power generation voltage level that is provided by the power sources included in the power generation system 110 that will be apparent to those skilled in the relevant art(s) without departing from the spirit and scope of the disclosure. The power generation system 110 may then provide the electric power at the power generation voltage level to the power distribution trailer 120 via a medium voltage cable.

In an embodiment, the power generation system 110 may generate electric power at a power level of at least 24 Mega Watts (MW) that is generated at a power generation voltage level of at least 13.8 kV. In another embodiment, the power generation system 110 may generate electric power at a power level of at least 24 MW that is generated at a power generation voltage level of at least 12.47 kW. The power generation system 110 may generate electric power at a power level such that there is sufficient electric power to adequately power each of the components of the hydraulic fracking operation 100 while having gas turbine engines in quantity and in size that enable the gas turbine engines to be transported to the fracking site and set up remotely via a trailer. In doing so, the power distribution trailer 110 may include gas turbine engines that generate sufficient electric power to adequately power each of the components of the hydraulic fracking operation 100 while not requiring a large quantity of gas turbine engines and gas turbine engines of significant size that may significantly increase the difficulty and the cost to transport the gas turbine engines to the fracking site.

In order to provide sufficient electric power to adequately power each of the components of the hydraulic fracking operation 100 while not requiring large quantities of gas turbine engines and/or gas turbine engines of significant size, the power distribution trailer 110 may include single or multiple gas turbine engines that generate electric power at power levels of 5 MW, 12 MW, 16 MW, 20-25 MW, 30 MW and/or any other wattage level that may not require large quantities of gas turbine engines and/or gas turbine engines of significant size that will be apparent to those skilled in the relevant art(s) without departing from the spirit and scope of the disclosure. In another example, the power generation system 110 may be the electric utility power plant that is local to the location of the fracking operation such that the power distribution trailer 120 may receive the electric power at the power level of 24 MW and the power generation voltage level of 12.47 kV directly from the electric utility power plant.

In an embodiment, the power generation system 110 may include a first gas turbine engine that generates electric power at a first power level in range of 12 MW to 16 MW and a second gas turbine engine that generates electric power at a second power level in a range of 12 MW to 16 MW. The first gas turbine engine and the second gas turbine engine generate the same voltage level of at least 13.8 kV that is provided to a power distribution trailer 120 when the first power level is in the range of 12 MW to 16 MW generated by the first gas turbine engine is combined with the second power level in the range of 12 MW to 16 MW. In order to provide sufficient electric power to adequately power each component of the hydraulic fracking operation 100 as well as limit the quantity of gas turbine engines as well as the size of the gas turbine engines such that the gas turbine engines may be positioned on a single trailer and transported to the fracking site, the power generation system 110 may include two electric gas turbine engines that generate electric power at power levels in the range of 12 MW to 16 MW such that the electric powers at the power levels in the range of 12 MW to 16 MW may be paralleled together to generate the total electric power that is available to power each of the components of the hydraulic fracking operation 100 is in the range of 24 MW to 32 MW.

Further, the power generation system 110 including more than one gas turbine engine to generate the electric power provides redundancy in the power generation for the hydraulic fracking operation 100. In doing so, the power generation system 110 provides a redundancy to the electric driven hydraulic fracking system in that the first gas turbine engine continues to provide the first power level to the power distribution trailer 120 when the second gas turbine engine suffers a short circuit and/or other shutdown condition and the second gas turbine engine continues to provide the second power level to the power distribution trailer 120 when the first gas turbine engine suffers the short circuit and/or other shutdown condition. The power generation system 110 may then maintain a reduced quantity of hydraulic pump(s) 160(*a-n*) to continuously operate in the continuous duty cycle without interruption in continuously pumping the fracking media due to the redundancy provided by the first gas turbine engine and the second gas turbine engine.

By incorporating two gas turbine engines that generate electric power at power levels in the range of 12 MW to 16 MW redundancy may be provided in that the electric power that is provided to the components of the hydraulic fracking operation 100 such that the fracking media is continuously pumped into the well to execute the fracking operation to prepare the well for the later extraction of the fluid from the well despite one of the gas turbine engines suffering a short circuit condition. In doing so, the incident energy at the point where the short circuit occurs may be reduced due to the reduced short circuit availability of the power generation system 110. However, if one of the gas turbine engines were to fail due to a short circuit condition, the remaining gas turbine engine may continue to provide sufficient power to ensure the fracking media is continuously pumped into the well. A failure to continuously pump the fracking media into the well may result in the sand, which is a major component of the fracking media coming out of the suspension and creating a plug at the bottom of the well which typically results in a significant expense to remove the sand in the well so that the fracking can continue. The power generation system 110 may include any combination of gas turbine engines and/or single gas turbine engine at any power level to sufficiently generate electric power to adequately power each of the components of the hydraulic fracking operation 100 that will be apparent to those skilled in the relevant art(s) without departing from the spirit and scope of the disclosure.

The power generation system 110 may generate the electric power at a power generation voltage level that is in the medium voltage range of 1.0 kilo Volts (kV) to 72.0 kV. However, in an embodiment, the power generation system 110 may generate the electric power at the power generation voltage level of 13.8 kV. In another embodiment, the power generation system 110 may generate the electric power at the power generation voltage level of 13.8 kV. The generation of the electric power at the voltage level in the medium voltage range enables medium voltage cables to be used to connect the power generation system 110 to the power distribution trailer 120 to propagate the electric power from the power generation system 110 to the power distribution trailer 120 as well as enabling the use of medium voltage cables to propagate the electric voltage level to any of the components powered by the electric power in the medium voltage range. The use of medium voltage cables rather than the use of low voltage cables decreases the size of the cable required in that medium voltage cables require less copper than low voltage cables thereby reducing the size and/or quantity of the cables required for the distribution of power throughout the hydraulic fracking operation 100.

Further, the consolidation of gas turbine engines to decrease the quantity of gas turbine engines required to power the components of the hydraulic fracking operation 100 and/or the incorporation of the electric utility power plant also consolidates the quantity of medium voltage cables that are required to connect each of the gas turbine engines to the power distribution trailer 120 thereby further reducing the cost of the cables required for the hydraulic fracking operation 100. Further, the power generation system 110 generated the electric power at the power generation voltage level of 13.8 kV and/or 12.47 kV enables the hydraulic fracking operation 100 to be more easily integrated with any electric utility grid anywhere in the world such that the electric utility grid may be more easily substituted into the power generation system 110 in replacement of the gas turbine engines since it is more common that the electric utility grid has transformers available to deliver the electric power at the power generation voltage level of 13.8 kV and/or 12.47 kV.

The power distribution trailer 120 may distribute the electric power at the power level generated by the power generation system 110 to each variable frequency drive (VFD) 140(*a-n*) positioned on each pump trailer 130(*a-n*). As noted above, the power generation system 110 may include at least one gas turbine engine, the electric utility grid, and/or a combination thereof, to generate the electric power. In doing so, a medium voltage power cable may be connected from each component of the power generation system 110 to the power distribution trailer 120. For example, the power generation system 110 may include two gas turbine engines with each of the gas turbine engines generating electric power at the power level of 12 MW to 16 MW at the voltage level of 13.8 kV. In such an example, two medium voltage cables may then connect each of the two gas turbine engines to the power distribution trailer 120 such that the electric power at the power level of 12 MW to 16 MW at the voltage level of 13.8 kV may propagate from the gas turbine engines to the power distribution trailer 120.

The power distribution trailer 120 may then distribute the electric power to each of the VFDs 140(*a-n*) positioned on each of the pump trailers 130(*a-n*). As will be discussed in detail below, several different hydraulic pumps 160(*a-n*) may be required to continuously pump the fracking media into the well to execute the fracking operation to prepare the well for the later extraction of the fluid from the well. In doing so, each of the different hydraulic pumps 160(*a-n*) may be driven by a corresponding VFD 140(*a-n*) also positioned on the corresponding pump trailer 130(*a-n*) with the hydraulic pump 160(*a-n*). Each of the VFDs 140(*a-n*) may then provide the appropriate power to drive each of the single shaft electric motors 150(*a-n*) that then drive each of the hydraulic pumps 160(*a-n*) to continuously pump the fracking media into the well to execute the fracking operation to prepare the well for the later extraction of the fluid from the well. Thus, the power distribution trailer 120 may distribute the electric power generated by the power distribution trailer 110 which is consolidated to reduce the quantity of the gas turbine engines to the several different VFDs 140(*a-n*) positioned on each of the pump trailers 130(*a-n*). The components of the power distribution trailer 120 may be transported to the fracking site.

For example, the power distribution trailer 120 is configured to distribute the electric power at the power level of at least 24 MW generated by the at least one gas turbine engine from the voltage level of at least 13.8 kV to the single VFD 140*a* positioned on the single pump trailer 130*a*. In such an example, the power generation system 110 includes two different gas turbine engines that generate the electric power at the power level of 12 MW to 16 MW and at the voltage level of 13.8 kV. Two different medium voltage cables may then propagate the electric power generated by each of the two gas turbine engines at the power level of 12 MW to 16 MW and at the voltage level of 13.8 kV to the power distribution trailer 120. The power distribution trailer 120 may then combine the power levels of 12 MW to 16 MW generated by each of the two gas turbine engines to generate a power level of 24 MW to 32 MW at the voltage level of 13.8 kV. The power distribution trailer 120 may then distribute the electric power at the voltage level of 13.8 kV to each of eight different VFDs 140(*a-n*) via eight different medium voltage cables that propagate the electric power at the voltage level of 13.8 kV from the power distribution trailer 120 to each of the eight different VFDs 140(*a-n*). The power distribution trailer 120 may distribute the power generated by any quantity of gas turbine engines to any quantity of VFDs that will be apparent to those skilled in the relevant art(s) without departing from the spirit and scope of the disclosure.

In an embodiment, the power distribution trailer 120 may include a plurality of switch gear modules in that each switch gear module switches the electric power generated by each of the components of the power generation system 110 and received by the corresponding medium voltage cable to the medium voltage cable on and off to each of the corresponding VFDs 140(*a-n*). For example, the power distribution trailer 120 may include eight different switch gear modules to independently switch the electric power generated by the two gas turbine engines at the medium voltage level of 13.8 kV as received by the two different medium voltage cables on and off to the eight different medium voltage cables for each of the eight corresponding VFDs 140(*a-n*) to distribute the electric power at the medium voltage level of 13.8 kV to each of the eight corresponding VFDs 140(*a-n*).

In such an embodiment, the switch gear modules may include a solid state insulated switch gear (2SIS) that is manufactured by ABB and/or Schneider Electric. Such medium voltage switch gears may be sealed and/or shielded such that there is no exposure to live medium voltage components. Often times the fracking site generates an immense amount of dust and debris so removing any environmental exposure to live medium voltage components as provided by the 2SIS gear may decrease the maintenance required for the 2SIS. Further, the 2SIS may be permanently set to distribute the electric power from each of the gas turbine engines to each of the different VFDs 140(*a-n*) with little maintenance. The power distribution trailer 120 may incorporate any type of switch gear and/or switch gear configuration to adequately distribute the electric power from the power generation system 110 to each of the different VFDs 140(*a-n*) that will be apparent to those skilled in the relevant art(s) without departing from the spirit and scope of the disclosure.

Figure 2:
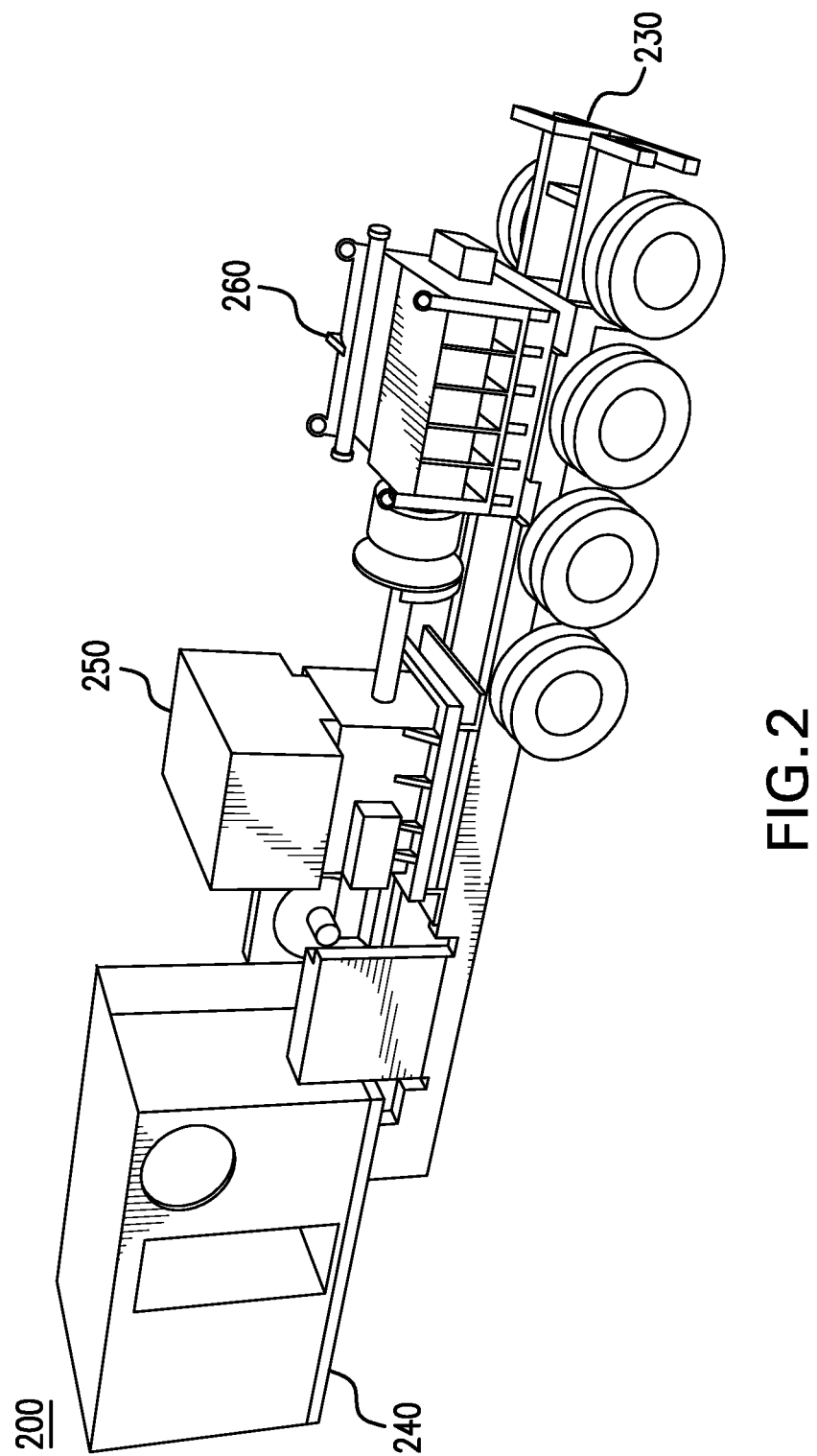
FIG. 2 illustrates a top-elevational view of a single pump configuration that includes a single VFD, a single shaft electric motor, and a single hydraulic pump that are each mounted on a single pump trailer.

As noted above, the power distribution trailer 120 may distribute the electric power at the power generation voltage level generated by the power generation system 110 to each of the different VFDs 140(*a-n*) positioned on the corresponding pump trailer 130(*a-n*). FIG. 2 illustrates a top-elevational view of a single pump configuration 200 that includes a single VFD 240, a single shaft electric motor 250 and a single hydraulic pump 260 that are each mounted on a single pump trailer 230. The single pump configuration 200 shares many similar features with each pump trailer 130(*a-n*) that includes each corresponding VFD 140(*a-n*), single shaft electric motor 150(*a-n*), and single hydraulic pump 160(*a-n*) depicted in the hydraulic fracking operation 100; therefore, only the differences between the single pump configuration 200 and the hydraulic fracking operation 100 are to be discussed in further details.

The power distribution trailer 120 may distribute the electric power at the voltage level generated by the power generation system 110 to the single VFD 240 that is positioned on the single pump trailer 130(*a-n*). The single VFD 240 may then drive the single shaft electric motor 250 and the single hydraulic pump 260 as well as control the operation of the single shaft electric motor 250 and the single hydraulic pump 260 as the single shaft electric motor 250 continuously drives the single hydraulic pump 260 as the single hydraulic pump 260 continuously pumps the fracking media into the well to execute the fracking operation to prepare the well for the later extraction of the fluid from the well. In doing so, the VFD 240 may convert the electric power distributed by the power distribution trailer 120 at the power generation voltage level generated by the power generation system 110 to a VFD voltage level that is a voltage level that is adequate to drive the single shaft electric motor 250. Often times, the power generation voltage level of the electric power distributed by the power distribution trailer 120 as generated by the power generation system 110 may be at a voltage level that is significantly higher than a voltage level that is adequate to drive the single shaft electric motor 250. Thus, the single VFD 240 may convert the power generation voltage level of the electric power as distributed by the power distribution trailer 120 to significantly lower (or higher) the voltage level to the VFD voltage level that is needed to drive the single shaft electric motor 250. In an embodiment, the single VFD 240 may convert the power generation voltage level of the electric power as distributed by the power distribution trailer 120 to the VFD voltage level of at least 4160V. In another embodiment, the single VFD 240 may convert the power generation voltage level of the electric power as distributed by the power distribution trailer 120 to the VFD voltage level that ranges from 4160V to 6600V. In another embodiment, the single VFD 240 may convert the power generation level of the electric power as distributed by the power distribution trailer 120 to the VFD voltage level that ranges from 0V to 4160V.

For example, the power generation system 110 generates the electric power at a power generation voltage level of 13.8 kV. The power distribution trailer 120 then distributes the electric power at the power generation voltage level of 13.8 kV to the single VFD 240. However, the single shaft electric motor 250 operates at a rated voltage level of at least 4160V in order to drive the single hydraulic pump 260 in which the rated voltage level of at least 4160V for the single shaft electric motor 250 to operate is significantly less than the power generation voltage level of 13.8 kV of the electric power that is distributed by the power distribution trailer 120 to the single VFD 240. The single VFD 240 may then convert the electric power at the power generation voltage level of at least 13.8 kV distributed from the power distribution trailer 120 to a VFD rated voltage level of at least 4160V and drive the single shaft electric motor 250 that is positioned on the single pump trailer 230 at the VFD rated voltage level of at least 4160V to control the operation of the single shaft electric motor 250 and the single hydraulic pump 260. The single VFD 240 may convert any voltage level of the electric power distributed by the power distribution trailer 120 to any VFD voltage level that is adequate to drive the single shaft electric motor that will be apparent to those skilled in the relevant art(s) without departing from the spirit and scope of the disclosure.

The single VFD 240 may also control the operation of the single shaft electric motor 250 and the single hydraulic pump 260. The single VFD 240 may include a sophisticated control system that may control in real-time the operation of the single shaft electric motor 250 and the single hydraulic pump 260 in order for the single shaft electric motor 250 and the single hydraulic pump 260 to adequately operate to continuously pump the fracking media into the well to execute the fracking operation to prepare the well for the later extraction of the fluid from the well. Although, the single shaft electric motor 250 and the single hydraulic pump 260 may operate continuously to continuously pump the fracking media into the well, such continuous operation may not be continuously executed with the same parameters throughout the continuous operation. The parameters in which the single shaft electric motor 250 and the single hydraulic pump 260 may continuously operate may actually vary based on the current state of the fracking operation. The single VFD 240 may automatically adjust the parameters in which the single shaft electric motor 250 and the single hydraulic pump continuously operate to adequately respond to the current state of the fracking operation.

As noted above, the single VFD 240 may convert the electric power at the power generation voltage level distributed by the power distribution trailer 120 to the VFD voltage level that is adequate to drive the single shaft electric motor 250. The single shaft electric motor 250 may be a single shaft electric motor in that the single shaft of the electric motor is coupled to the single hydraulic pump 260 such that the single shaft electric motor 250 drives a single hydraulic pump in the single hydraulic pump 260. The single shaft electric motor 250 may continuously drive the single hydraulic pump 260 at an operating frequency to enable the single hydraulic pump 260 to continuously pump the fracking media into the well to execute the fracking operation to prepare the well for the later extraction of the fluid from the well. The single shaft electric motor 250 may operate at the VFD voltage levels and at the operating frequencies below or above the rated levels in order to rotate at a RPM level that is appropriate to continuously drive the single hydraulic pump 260 at the maximum horsepower (HP) level that the single hydraulic pump 260 is rated to pump. In an embodiment, the single shaft electric motor 250 may operate at a VFD voltage level of at least 4160V. In an embodiment, the single shaft electric motor 250 may operate at a VFD voltage level in a range of 4160V to 6600V. In an embodiment, the single shaft electric motor 250 may operate at a VFD voltage level in arrange of 0V to 4160V. The single shaft electric motor 250 may operate any VFD voltage level that is adequate to continuously drive the single hydraulic pump 260 that will be apparent to those skilled in the relevant art(s) without departing from the spirit and scope of the disclosure.

For example, the power distribution trailer 120 may distribute the electric power to the single VFD 240 at the power generation voltage level of 13.8 kV. The single VFD 240 may then convert the electric power at the power generation voltage level of 13.8 kV to the VFD voltage level of 4160V to adequately drive the single shaft electric motor 250. The single shaft electric motor 250 may operate at an operating frequency of 60 Hz and when the VFD voltage level of 4160V to adequately drive the single shaft electric motor at the operating frequency of 60 Hz, the single shaft electric motor 250 may then rotate at a RPM level of at least 750 RPM. The single shaft electric motor 250 may rotate at a RPM level of at least 750 RPM based on the VFD voltage level of at least 4160V as provided by the single VFD 240 and to drive the single hydraulic pump 260 that is positioned on the single pump trailer 230 with the single VFD 240 and the single shaft electric motor 250 with the rotation at the RPM level of at least 750 RPM.

In an embodiment, the single shaft electric motor 250 may rotate at a RPM level of at least 750 RPM. In an embodiment, the single shaft electric motor 250 may rotate at a RPM level of 750 RPM to 1400 RPM. The single shaft electric motor 250 may operate at any RPM level to continuously drive the single hydraulic pump 260 that will be apparent to those skilled in the relevant art(s) without departing from the spirit and scope of the disclosure. The single shaft electric motor may operate at any operating frequency to continuously drive the single hydraulic pump 260 that will be apparent to those skilled in the relevant art(s) without departing from the spirit and scope of the disclosure.

The single shaft electric motor 250 may be an induction motor that rotates at the RPM level needed to obtain required pump speed based on the input gear box ratio of the single hydraulic pump 260. Based on the operating frequency of the single shaft motor 250 and the VFD voltage level applied to the single shaft electric motor 250, the single shaft electric motor 250 may then rotate at the required RPM level and produce sufficient torque to cause the pump to produce the required flow rate of fracking media at the required output pressure level. However, the VFD voltage level applied to the single shaft electric motor 250 may be determined based on the input gear box ratio of the single hydraulic pump 260 as the single shaft electric motor 250 cannot be allowed to rotate at the RPM level that exceeds the maximum speed rating of the input gear box of the single hydraulic pump 260 or the maximum speed of the single hydraulic pump 260. The single shaft electric motor 250 may be an induction motor, a traction motor, a permanent magnet motor and/or any other electric motor that continuously drives the single hydraulic pup 260 that will be apparent to those skilled in the relevant art(s) without departing from the spirit and scope of the disclosure.

As noted above, the single shaft electric motor 250 may be coupled to a single hydraulic pump in the single hydraulic pump 260 and drive the single hydraulic pump 260 such that the single hydraulic pump 260 continuously pumps the fracking media into the well to execute the fracking operation to prepare the well for the later extraction of the fluid from the existing well. The single hydraulic pump 260 may operate on a continuous duty cycle such that the single hydraulic pump 260 continuously pumps the fracking media into the well. Rather than operating on an intermittent duty cycle that causes conventional hydraulic pumps to temporarily stall in the pumping of the fracking media into the well, the single hydraulic pump 260 in operating on a continuous duty cycle may continuously pump the fracking media into the well without any intermittent stalling in the pumping. In doing so, the efficiency in the fracking operation to prepare the well for the later extraction of the fluid from the well may significantly increase as any intermittent stalling in pumping the fracking media into the well may result in setbacks in the fracking operation and may increase the risk of sand plugging the existing well. Thus, the single hydraulic pump 260 in operating on the continuous duty cycle may prevent any setbacks in the fracking operation due to the continuous pumping of the fracking media into the well.

The single hydraulic pump 260 may continuously pump the fracking media into the well at the HP level that the single hydraulic pump 260 is rated. The increase in the HP level that the single hydraulic pump 260 may continuously pump the fracking media into the well may result in the increase in the efficiency in the fracking operation to prepare the well for later extraction of the fluid from the well. For example, the single hydraulic pump 260 may continuously pump the fracking media into the well at the HP level of at least 5000 HP as driven by the single shaft motor 250 at the RPM level of at least 750 RPM. The single hydraulic pump 260 operates on a continuous duty cycle to continuously pump the fracking media at the HP level of at least 5000 HP. In an embodiment, the single hydraulic pump 260 may operate at continuous duty with a HP level of 5000 HP and may be a Weir QEM5000 Pump. However, the single hydraulic pump 260 may any type of hydraulic pump that operates on a continuous duty cycle and at any HP level that adequately continuously pumps the pumping fracking media into the well to execute the fracking operation to prepare the well for the later extraction of the fluid from the well that will be apparent to those skilled in the relevant art(s) without departing from the spirit and scope of the disclosure.

The single pump trailer 230 discussed in detail above may then be incorporated into the hydraulic fracking operation 100 depicted in FIG. 1. Each of the several pumps trailers 130(*a-n*), where n is an integer equal to or greater than one, may be in incorporated into the hydraulic fracking operation 100 to increase the overall HP level that is applied to the fracking equipment positioned on the fracking trailer 170 by each of the single hydraulic pumps 160(*a-n*) positioned on each of the pump trailers 130(*a-n*). In doing so, the overall HP level that is applied to the fracking equipment positioned on the fracking trailer 170 to continuously pump the fracking media into the well may be significantly increased as the HP level that is applied to the fracking equipment is scaled with each single hydraulic pump 160(*a-n*) that is added to the hydraulic fracking operation 100.

The positioning of each single VFD 140(*a-n*), single shaft electric motor 150(*a-n*), and each single hydraulic pump 160(*a-n*) positioned on each corresponding pump trailer 130(*a-n*) enables the power distribution trailer 120 to distribute the electric power at the power generation voltage level to each single VFD 140(*a-n*) from a single power distribution source rather than having a corresponding single power distribution source for each single VFD 140(*a-n*), single shaft electric motor 150(*a-n*), and each single hydraulic pump 160(*a-n*). In doing so, the electric power at the power generation voltage level may be distributed to each single VFD 140(*a-n*), where n is in an integer equal to or greater than one and corresponds to the number of pump trailers 130(*a-n*), then each single VFD 140(*a-n*) may individually convert the power generation voltage level to the appropriate VFD voltage for the single shaft electric motor 150(*a-n*) and the single hydraulic pump 160(*a-n*) that is positioned on the corresponding pump trailer 130(*a-n*) with the single VFD 140(*a-n*). The single VFD 140(*a-n*) may then also control the corresponding single shaft electric motor 150(*a-n*) and the single hydraulic pump 160(*a-n*) that is positioned on the corresponding pump trailer 130(*a-n*) with the single VFD 140(*a-n*).

In isolating the single VFD 140(*a-n*) to convert the electric power at the power generation voltage level to the appropriate VFD voltage level for the single shaft electric motor 150(*a-n*) and the single hydraulic pump 160(*a-n*) positioned on the corresponding single pump trailer 130(*a-n*) as the single VFD 140(*a-n*), the capabilities of the single pump trailer 130(*a-n*) may then be easily scaled by replicating the single pump trailer 130(*a-n*) into several different pump trailers 130(*a-n*). In scaling the single pump trailer 130(*a-n*) into several different pump trailers 130(*a-n*), the parameters for the single VFD 140(*a-n*), the single shaft electric motor 150(*a-n*), and the single hydraulic pump 160(*a-n*) may be replicated to generate the several different pump trailers 130(*a-n*) and in doing so scaling the hydraulic fracking operation 100.

In doing so, each single VFD 140(*a-n*) may convert the electric power at the power generation voltage level as distributed by the power distribution trailer 120 to the VFD voltage level to drive each single shaft electric motor 150(*a-n*), where n is an integer equal to or greater than one and corresponds to the quantity of single VFDs 140(*a-n*) and pump trailers 130(*a-n*), such that each single shaft electric motor 150(*a-n*) rotates at the RPM level sufficient to continuously drive the single hydraulic pump 160(*a-n*) at the HP level of the single hydraulic pump 160(*a-n*). Rather than simply having a single hydraulic pump 260 as depicted in FIG. 2 and discussed in detail above to continuously pump at the HP level of the single hydraulic pump 260, several different hydraulic pumps 160(*a-n*), where n is an integer equal to or greater than one and corresponds to the to the quantity of single VFDs 140(*a-n*), single shaft electric motors 150(*a-n*) and pump trailers 130(*a-n*), as positioned on different pump trailers 160 may be scaled together to scale the overall HP level that is provided to the fracking equipment as positioned on the fracking trailer 170. In doing so, the overall HP level that is provided to the fracking equipment to continuously pump the fracking media into the well to execute the fracking operation to prepare the well for the later extraction of the fluid from the well may be easily scaled by incorporating each of the individual pump trailers 130(*a-n*) each with single hydraulic pumps 160(*a-n*) operating at the HP levels to scale the HP levels of the single hydraulic pumps 160(*a-n*) to generate the overall HP level for the hydraulic fracking operation 100.

For example, each of the single hydraulic pumps 160(*a-n*) positioned on each corresponding pump trailer 130(*a-n*) may be operating on a continuous duty cycle at a HP level of at least 5000 HP. A total of eight pump trailers 130(*a-n*) each with a single hydraulic pump 160(*a-n*) positioned on the corresponding pump trailer 130(*a-n*) results in a total of eight hydraulic pumps 160(*a-n*) operating on a continuous duty cycle at a HP level of at least 5000 HP. In doing so, each of the eight hydraulic pumps 160(*a-n*) continuously pump the fracking media into the well at a HP level of at least 40,000 HP and do so continuously with each of the eight hydraulic pumps 160(*a-n*) operating on a continuous duty cycle. Thus, the fracking media may be continuously pumped into the well at a HP level of at least 40,000 HP to execute the fracking operation to prepare the well for the later extraction of the fluid from the well. The hydraulic pumps 160(*a-n*) positioned on each corresponding pump trailer 130(*a-n*) may operate on a continuous duty at any HP level and the and the quantity of pump trailers may be scaled to any quantity obtain an overall HP level for the hydraulic fracking operation 100 that will be apparent to those skilled in the relevant art(s) without departing from the spirit and scope of the disclosure.

Further, conventional hydraulic fracking operations that incorporate diesel engines require a diesel engine to drive each conventional hydraulic pump rather than being able to consolidate the power generation to a power generation system 110 that consolidates the quantity and size of the gas turbine engines to generate the electric power. Such an increase in diesel engines significantly increases the cost of the fracking operation in that significantly more trailers and/or significantly over size/weight trailers are required to transport the diesel engines resulting in significantly more and/or specialized semi-trucks and/or trailers required to transport the diesel engines which requires significantly more CDL drivers. As the overall asset count increases at the fracking site, the overall cost increases due to the increased amount of manpower required, the costs and delays related to permitted loads, as well as an increase in the amount of rigging that is required to rig each of the diesel engines to the conventional hydraulic pumps and so on. Rather, the electric driven hydraulic fracking operation 100 decreases the asset count by consolidating the power generation to the gas turbine engines of decreased size and quantity that are consolidated into the power generation system 110. The power distribution trailer 120 then further decreases the cost by consolidating the medium voltage cabling that is required to power each of the assets thereby decreasing the amount of rigging required.

Further, conventional hydraulic fracking operations that incorporate diesel engines suffer significant parasitic losses throughout the different components included in the fracking operation. Diesel engines that generate at a power level equal to the rated power level of the conventional fracking pumps may not result in delivering the full rated power to the pump due to parasitic losses throughout the conventional diesel fracking trailer configuration. For example, the diesel engines may suffer parasitic losses when driving the hydraulic coolers and the lube pumps that are associated with the conventional hydraulic pump in addition to the parasitic losses suffered from driving the conventional hydraulic pump itself. In such an example, the diesel engine may be driving the conventional hydraulic pump that is rated at 2500 HP at the HP level of 2500 HP but due to parasitic losses, the diesel engine is actually only driving the conventional hydraulic pump at 85% of the HP level of 2500 HP due to the parasitic losses. However, the electric driven hydraulic fracking operation 100 may have the single hydraulic pump 160(*a-n*) that is rated at the HP level of 5000 HP, however, the parasitic loads are controlled by equipment running in parallel with the single hydraulic pump 160(*a-n*), thus the single VFD 140(*a-n*) associated with each corresponding single hydraulic pump 160(*a-n*) provides all of its output electric power to the single hydraulic pump 160(*a-n*), the single hydraulic pump 160(*a-n*) actually continuously pumps the fracking media into the well at 5000 HP. Thus, the asset count required for the electric driven hydraulic fracking operation 100 is significantly reduced as compared to the hydraulic fracking operations that incorporate diesel engines due to the lack of parasitic losses for the electric driven hydraulic fracking operation 100.

Further, the conventional hydraulic fracking operations that incorporate diesel engines generate significantly more noise than the electric driven hydraulic fracking operation 100. The numerous diesel engines required in the conventional hydraulic fracking operations generate increased noise levels in that the diesel engines generate noise levels at 110 Dba. However, the gas turbine engines incorporated into the power generation system 110 of the electric driven hydraulic fracking operation 100 generate noise levels that are less than 85 Dba. Often times, the fracking site has noise regulations associated with the fracking site in that the noise levels of the fracking operation cannot exceed 85 Dba. In such situations, an increased cost is associated with the conventional hydraulic fracking operations that incorporate diesel engines in attempts to lower the noise levels generated by the diesel engines to below 85 Dba or having to build sound walls to redirect the noise in order to achieve noise levels below 85 Dba. The electric driven fracking operation 100 does not have the increased cost as the noise levels of the oilfield gas turbine engines include silencers and stacks, thus they already fall below 85 Dba.

Further, the increase in the quantity of conventional hydraulic pumps further increases the asset count which increases the cost as well as the cost of operation of the increase in quantity of conventional hydraulic pumps. Rather than having eight single hydraulic pumps 160(*a-n*) rated at the HP level of 5000 HP to obtain a total HP level of 40000 HP for the fracking site, the conventional hydraulic fracking systems require sixteen conventional hydraulic pumps rated at the HP level of 2500 HP to obtain the total HP level of 40000 HP. In doing so, a significant cost is associated with the increased quantity of conventional hydraulic pumps. Further, conventional hydraulic pumps that fail to incorporate a single VFD 140(*a-n*), a single shaft electric motor 150(*a-n*), and a single hydraulic pump 160 (*a-n*) onto a single pump trailer 130(*a-n*) further increase the cost by increasing additional trailers and rigging required to set up the numerous different components at the fracking site. Rather, the electric driven hydraulic fracking operation 100 incorporates the power distribution trailer 120 to consolidate the power generated by the power generation system 110 and then limit the distribution and the cabling required to distribute the electric power to each of the single pump trailers 130(*a-n*).

In addition to the fracking equipment positioned on the fracking trailer 170 that is electrically driven by the electric power generated by the power generation system 110 and each of the VFDs 140(*a-n*), single shaft electric motors 150(*a-n*), and the single hydraulic pumps 160(*a-n*) that are also electrically driven by the electric power generated by the power generation system 110, a plurality of auxiliary systems 190 may be positioned at the fracking site may also be electrically driven by the electric power generated by power generation system 110. The auxiliary systems 190 may assist each of the single hydraulic pumps 160(*a-n*) as well as the fracking equipment positioned on the fracking trailer 170 as each of the hydraulic pumps 160(*a-n*) operate to execute the fracking operation to prepare the well for the later extraction of the fluid from the well. In doing so, the auxiliary systems 190 may be systems in addition to the fracking equipment positioned on the fracking trailer 170 and the single hydraulic pumps 160(*a-n*) that are required to prepare the well for the later execution of the fluid from the well.

For example, the auxiliary systems 190, such as a hydration system that provides adequate hydration to fracking media as the single hydraulic pumps 160(*a-n*) continuously pump the fracking media into the well. Thus, auxiliary systems 190 may include but are not limited to hydration systems, chemical additive systems, blending systems, sand storage and transporting systems, mixing systems and/or any other type of system that is required at the fracking site that is addition to the fracking equipment positioned on the fracking trailer 170 and the single hydraulic pumps 160(*a-n*) that may be electrically driven by the electric power generated by the power generation system 110 that will be apparent to those skilled in the relevant art(s) without departing from the spirit and scope of the disclosure.

The electric power generated by the power generation system 110 may thus be distributed by the power distribution trailer 120 such that the electric power generated by the power generation system 110 may also be incorporated to power the auxiliary systems 190. In doing so, the electric power generated by the power generation system 110 may be incorporated to not only drive the pump trailers 130(a-n) via the single VFDs 140(a-n) positioned on each pump trailer 130(a-n) but to also power the auxiliary systems 190. Thus, the hydraulic fracking operation 100 may be completely electric driven in that each of the required systems positioned on the fracking site may be powered by the electric power generated by the electric power that is consolidated to the power generation system 110.

As noted above, each of the single VFDs 140(a-n) may include a sophisticated control system that may control in real-time the operation of the single shaft electric motors 150(a-n) and the single hydraulic pumps 160(a-n) in order for the single shaft electric motors 150(a-n) and the single hydraulic pumps 160(a-n) to optimally operate to continuously pump the fracking media into the well to execute the fracking operation to prepare the well for the later extraction of the fluid from the well. However, the fracking control center 180 that may be positioned at the fracking site and/or remote from the fracking site may also control the single VFDs 140(a-n) and in doing so control the real-time operation of the single shaft electric motors 150(a-n) and the single hydraulic pumps 160(a-n) in order for the single shaft electric motors 150(a-n) and the single hydraulic pumps 160(a-n) to optimally operate to continuously pump the fracking media into the well to execute the fracking operation to extract the fluid from the well. In doing so, the fracking control center 180 may intervene to control the single VFDs 140(a-n) when necessary. The fracking control center 180 may also control the fracking equipment positioned on the fracking trailer 170 as well as the auxiliary systems 190 in order to ensure that the fracking operation is optimally executed to prepare the well for the later extraction of the fluid from the well.

Communication between the fracking control center 180 and the single VFDs 140(a-n), the fracking equipment positioned on the fracking trailer 170, and/or the auxiliary systems 190 may occur via wireless and/or wired connection communication. Wireless communication may occur via one or more networks 105 such as the internet or Wi-Fi wireless access points (WAP. In some embodiments, the network 105 may include one or more wide area networks (WAN) or local area networks (LAN). The network may utilize one or more network technologies such as Ethernet, Fast Ethernet, Gigabit Ethernet, virtual private network (VPN), remote VPN access, a variant of IEEE 802.11 standard such as Wi-Fi, and the like. Communication over the network 105 takes place using one or more network communication protocols including reliable streaming protocols such as transmission control protocol (TCP), Ethernet, Modbus, CanBus, EtherCAT, ProfiNET, and/or any other type of network communication protocol that will be apparent from those skilled in the relevant art(s) without departing from the spirit and scope of the present disclosure. Wired connection communication may occur but is not limited to a fiber optic connection, a coaxial cable connection, a copper cable connection, and/or any other type of direct wired connection that will be apparent from those skilled in the relevant art(s) without departing from the spirit and scope of the present disclosure. These examples are illustrative and not intended to limit the present disclosure.

Electric Power Distribution and Control

Figure 3:
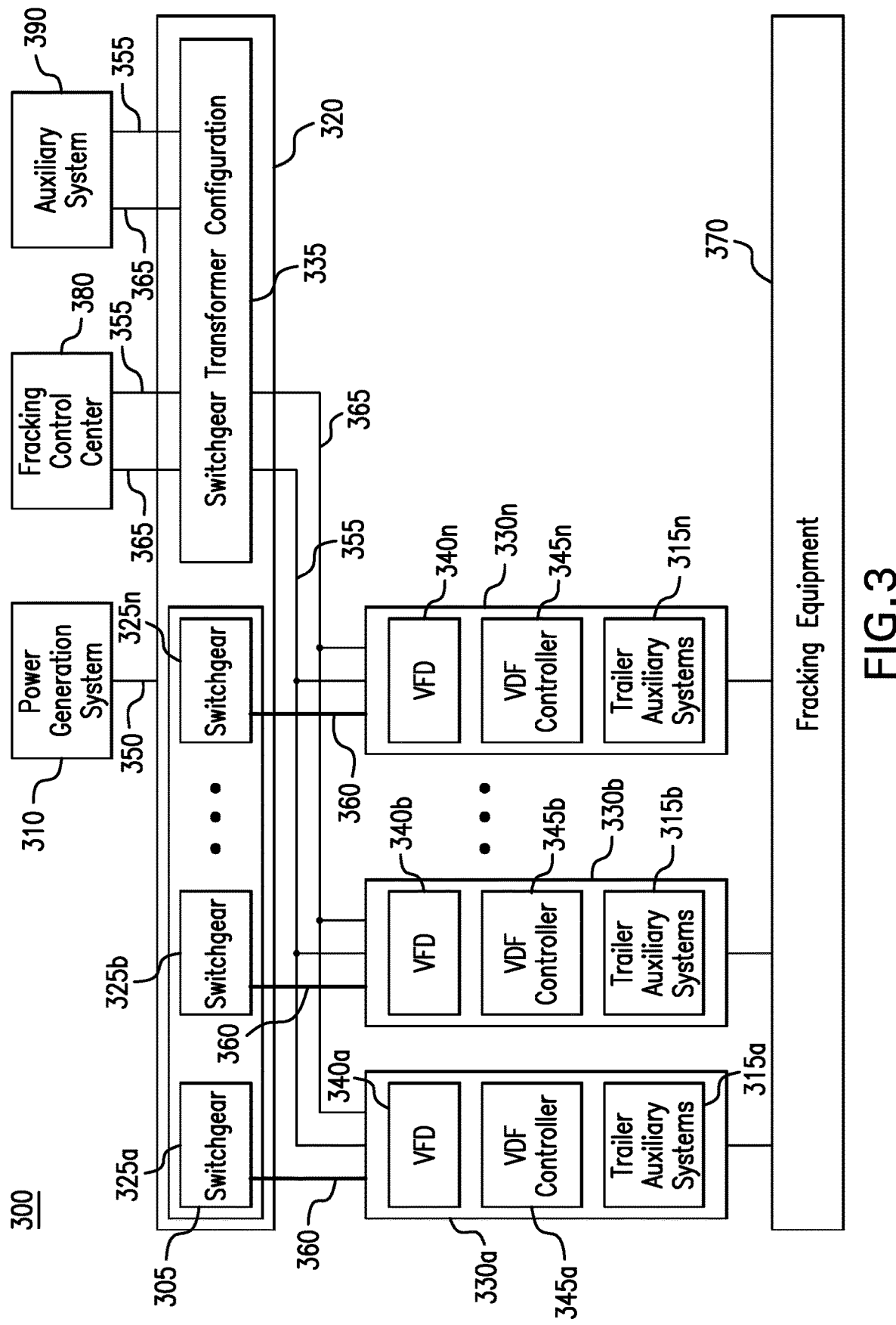
FIG. 3 illustrates a block diagram of an electric driven hydraulic fracking system that provides an electric driven system to execute a fracking operation in that the electric power is produced by a power generation system and then distributed such that each component in the electric driven hydraulic fracking system is electrically powered.

FIG. 3 illustrates a block diagram of an electric driven hydraulic fracking system that provides an electric driven system to execute a fracking operation in that the electric power is consolidated in a power generation system and then distributed such that each component in the electric driven hydraulic fracking system is electrically powered. An electric driven hydraulic fracking system 300 includes a power generation system 310, a power distribution trailer 320, a plurality of pump trailers 330(a-n), a plurality of single VFDs 340(a-n), a switchgear configuration 305, a plurality of trailer auxiliary systems 315(a-n), a plurality of switchgears 325(a-n), a switchgear transformer configuration 335, and fracking equipment 370. The electric power is consolidated in the power generation system 310 and then distributed at the appropriate voltage levels by the power distribution trailer 320 to decrease the medium voltage cabling required to distribute the electric power. The single VFDs 340(a-n) and the trailer auxiliary systems 315(a-n) positioned on the pump trailers 330(a-n) as well as the fracking control center 380 and auxiliary systems 390 are electrically powered by the electric power that is consolidated and generated by the power generation system 310. The electric driven hydraulic fracking system 300 shares many similar features with the hydraulic fracking operation 100 and the single pump configuration 200; therefore, only the differences between the electric driven hydraulic fracking system 300 and the hydraulic fracking operation 100 and single pump configuration 200 are to be discussed in further detail.

As noted above, the power generation system 310 may consolidate the electric power 350 that is generated for the electric driven hydraulic fracking system 300 such that the quantity and size of the power sources included in the power generation system 310 is decreased. As discussed above, the power generating system 310 may include numerous power sources as well as different power sources and any combination thereof. For example, the power generating system 310 may include power sources that include a quantity of gas turbine engines. In another example, the power generation system 310 may include a power source that includes an electric power plant that independently generates electric power for an electric utility grid. In another example, the power generation system 310 may include a combination of gas turbine engines and an electric power plant. The power generation system 310 may generate the electric power 350 at a power level and a voltage level.

The power generation system 310 may generate electric power at a power generation voltage level in which the power generation voltage level is the voltage level that the power generation system is capable of generating the electric power 350. For example, the power generation system 310 when the power sources of the power generation system 310 include a quantity of gas turbine engines may generate the electric power 350 at the voltage level of 13.8 kV which is a typical voltage level for electric power 350 generated by gas turbine engines. In another example, the power generation system 310 when the power sources of the power generation system include an electric power plan may generate the electric power 350 at the voltage level of 12.47 kV which is a typical voltage level for electric power 350 generated by an electric power plant.

In another example, the power generation system 310 may generate electric power 350 that is already at the VFD voltage level to power the single shaft electric motor 150 (a-n) as discussed in detail below. In such an example, the power generation system 310 may generate the electric power 350 that is already at the VFD voltage level of 4160V. In another example, the power generation system 310 may generate the electric power 350 at the power generation voltage level in range of 4160V to 15 kV. In another example, the power generation system 310 may generate electric power 350 at the power generation voltage level of up to 38 kV. The power generation system 310 may generate the electric power 350 at any power generation voltage level that is provided by the power sources included in the power generation system 310 that will be apparent to those skilled in the relevant art(s) without departing from the spirit and scope of the disclosure. The power generation system 310 may then provide the electric power 350 at the power generation voltage level to the power distribution trailer 320 via a medium voltage cable.

In continuing for purposes of discussion, the power distribution trailer 320 may then distribute the electric power 350 at the power generation voltage level to a plurality of single VFDs 340(a-n), where n is an integer equal to or greater than two, with each single VFD 340(a-n) positioned on a corresponding single trailer 330(a-n) from a plurality of single trailers, where n is an integer equal to or greater than two. The power distribution trailer 320 may include a switchgear configuration 305 that includes a plurality of switchgears 325(a-n), where n is an integer equal to or greater than two, to distribute the electric power 350 generated by the at least one power source included in the power distribution trailer 310 at the power generation voltage level 360 to each corresponding single VFD 340(a-n) positioned on each corresponding trailer 330(a-n).

Since the electric power 350 is consolidated to the power generation system 310, the switch gear configuration 305 of the power distribution trailer 320 may distribute the electric power 350 at the power generation voltage level as generated by the power generation system 310 to each of the single VFDs 340(a-n) as electric power 360 at the power generation voltage level such that the each of the single VFDs 340(a-n) may then drive the single shaft electric motors and the single hydraulic pumps as discussed in detail below. For example, the switch gear configuration 305 of the power distribution trailer 320 may distribute the electric power 350 at the power generation voltage level of 13.8 kV to each of the single VFDs 340(a-n) as electric power 360 at the power generation voltage level of 13.8 kV when the power distribution system 310 has power sources that include gas turbine engines. In another example, the switch gear configuration 305 of the power distribution trailer 320 may distribute the electric power 350 at the power generation level of 12.47 kV to each of the single VFDs 340(a-n) as electric power 360 at the power generation level of 12.47 kV when the power distribution 310 has power sources that include an electric power plant.

In order for the electric power to be consolidated to the power generation system 310 as well as to provide an electric driven system in which each of the components of the electric driven hydraulic fracking system 300 is driven by the electric power generated by the power generation system 310, the power distribution trailer 320 provides the flexibility to distribute the electric power 350 generated by the power generation system 310 at different voltage levels. In adjusting the voltage levels that the electric power 350 generated by the power generation system 310 is distributed, the power distribution trailer 320 may then distribute the appropriate voltage levels to several different components included in the electric driven hydraulic fracking system 300 to accommodate the electric power requirements of the several different components included in the electric driven hydraulic fracking system 300. For example, the power distribution trailer 320 may distribute the electric power 360 generated by the power generation system 310 at the voltage level of 13.8 kV as generated by the power generation system 310 via the switch gears 325(a-n) to each of the single VFDs 340(a-n) for the each of the single VFDs 340(a-n) to drive the single shaft electric motors and the single hydraulic pumps. In another example, the power distribution trailer 320 may distribute the electric power 360 generated by the power generation system 310 at the voltage level of 12.47 kV as generated by the power generation system 310 via the switch gears 325(a-n) to each of the single VFDs 340(a-n) for each of the single VFDs 340(a-n) to drive the single shaft electric motors and the single hydraulic pumps.

However, the electric power distribution trailer 320 may also distribute the electric power 350 generated by the power generation system 310 at a decreased voltage level from the voltage level of the electric power 350 originally generated by the power generation system 310. Several different components of the electric driven hydraulic fracking system 300 may have power requirements that require electric power at a significantly lower voltage level than the electric power 350 originally generated by the power generation system 310. In doing so, the power distribution trailer 320 may include a switchgear transformer configuration 335 that may step-down the voltage level of the electric power 350 as originally generated by the power distribution trailer 310 to a lower voltage level that satisfies the power requirements of those components that may not be able to handle the increased voltage level of the electric power 350 originally generated by the power distribution trailer 310. In doing so, the electric power distribution trailer 320 may provide the necessary flexibility to continue to consolidate the electric power 350 to the power generation system 310 while still enabling each of the several components to be powered by the electric power generated by the power generation system 310.

For example, the switchgear transformer configuration 335 may convert the electric power 350 generated by the at least one power source of the power generation system 310 at the power generation voltage level to at an auxiliary voltage level that is less than the power generation voltage level. The switchgear transformer configuration 335 may then distribute the electric power 355 at the auxiliary voltage level to each single VFD 340(a-n) on each corresponding single trailer 330(a-n) to enable each single VFD 340(a-n) from the plurality of single VFDs 340(a-n) to communicate with the fracking control center 380. The switchgear transformer configuration 335 may also distribute the electric power 355 at the auxiliary voltage level to a plurality of auxiliary systems 390. The plurality of auxiliary systems 390 assists each single hydraulic pump as each hydraulic pump from the plurality of single hydraulic pumps operate to prepare the well for the later extraction of the fluid from the well.

In such an example, the switchgear transformer configuration 335 may convert the electric power 350 generated by the power generation system 310 with power sources include gas turbine engines at the power generation voltage level of 13.8 kV to an auxiliary voltage level of 480V that is less than the power generation voltage level of 13.8 kV. The switchgear transformer configuration 335 may then distribute the electric power 355 at the auxiliary voltage level of 480V to each single VFD 340(a-n) on each corresponding single trailer 330(a-n) to enable each single VFD 340(a-n) from the plurality of single VFDs 340(a-n) to communicate with the fracking control center 380. The switchgear transformer configuration 335 may also distribute the electric power 355 at the auxiliary voltage level of 480V to a plurality of auxiliary systems 390.

In another example, the switchgear transformer configuration 335 may convert the electric power 350 generated by the power generation system 310 with power sources that include an electric power plant at the power generation voltage level of 12.47 kV to an auxiliary voltage level of 480V that is less than the power generation voltage level of 12.47 kV. In another example, the switchgear transformer configuration 33 may convert the electric power 350 at the power generation voltage level generated by the power generation system 310 to the auxiliary voltage level of 480V, 120V, 24V and/or any other auxiliary voltage level that is less than the power generation voltage level. The switchgear transformer configuration 335 may convert the electric power 350 at the power generation voltage level generated by the power generation system 310 to any auxiliary voltage level that is less than the power generation voltage level to assist each single VFD 340(a-n) in executing operations that do not require the electric power 360 at the power generation voltage level that will be apparent to those skilled in the relevant art(s) without departing from the spirit and scope of the disclosure.

Unlike each of the single VFDs 340(a-n) that may convert the electric power 360 at the power generation voltage level to drive the single shaft electric motors and the single hydraulic pumps, the fracking control center 380, the auxiliary systems 390, the trailer auxiliary systems 315(a-n) as well as the operation of features of the single VFDS 340(a-n) that are unrelated to the driving of the single shaft electric motors and the single hydraulic pumps require the electric power to be stepped down to the electric power 355 at the auxiliary voltage level. The switchgear transformer configuration 335 may provide the necessary flexibility to stepdown the electric power 360 at the power generation voltage level to the generate the electric power 355 at the auxiliary voltage level such that the remaining components of the electric driven hydraulic fracking system 300 may also be electrically driven by the electric power consolidated to the power generation system 310.

In stepping down the electric power 350 generated by the power generation system 310 at the power generation voltage level, the switchgear transformer configuration 335 may provide the electric power 355 at the auxiliary voltage level to the auxiliary systems 390. In doing so, the auxiliary systems 390 may be electrically driven by the electric power 355 at the auxiliary voltage level such that the electric power consolidated by the power generation system 310 may drive the auxiliary systems 390. The auxiliary systems 390 may include but are not limited hydration systems, chemical additive systems, fracturing systems, blending systems, mixing systems and so on such that each of the auxiliary systems 390 required to execute the fracking operation may be electrically driven by the electric power consolidated by the power generation system 310. Further, the power distribution trailer 320 may also route a communication link 365 to each of the auxiliary systems 390 such that the fracking control center 380 may intervene and control each of the auxiliary systems 390 via the communication link 365 if necessary.

The switchgear transformer configuration 335 may also provide the electric power 355 at the auxiliary voltage level to the fracking control center 380. In providing the auxiliary voltage level to the fracking control center 380, the fracking control center 380 may remotely control the auxiliary systems 390, the single VFDs 340(a-n), as well as the trailer auxiliary systems 315(a-n) as requested by the fracking control center 380. The power distribution trailer 320 may route the communication link 365 to the auxiliary systems 390, the single VFDs 340(a-n), and the trailer auxiliary systems 315(a-n) such that the fracking control center 380 may communicate with each of the auxiliary systems 390, the single VFDs 340(a-n), and the trailer auxiliary systems 315(a-n) and thereby control via the communication link 365. As discussed above, the communication link 365 may be a wireline and/or wireless communication link.

The switchgear transformer configuration 335 may also provide the electric power 355 at the auxiliary voltage level to each of the single VFDs 340(a-n). As discussed above and below, the single VFDs 340(a-n) convert the electric power 360 generated by the power generation system 310 at the power generation voltage level to drive the single shaft electric motors and the single hydraulic pumps. However, the single VFD 340(a-n) may also operate with different functionality without having to drive the single shaft electric motors and the single hydraulic pumps. For example, the auxiliary systems 315(a-n) positioned on the pump trailers 330(a-n) and/or included in the single VFDs 340(a-n) may operate as controlled by a corresponding VFD controller 345(a-n) that is positioned on the corresponding single trailer 330(a-n) and associated with the corresponding single VFD 340(a-n).

In doing so, the single VFD controllers 345(a-n) may operate the auxiliary systems 315(a-n) when the single VFD 340(a-n) is simply provided the electric power 355 at the auxiliary voltage level rather than having to operate with the electric power 360 at the power generation voltage level. In doing so, the fracking control center 380 may also communicate with the VFD controllers 345(a-n) and the single VFDs 340(a-n) as well as the trailer auxiliary systems 315(a-n) via the communication link 365 when the stepped-down electric power 355 at the auxiliary voltage level is provided to each of the single VFDs 340(a-n). In addition to operating auxiliary systems 315(a-n) when the corresponding single VFD 340(a-n) is provided the electric power 355 at the auxiliary voltage level, the VFD controller 345(a-n) may also operate the trailer auxiliary systems 315(a-n) as well as control the corresponding single shaft electric motor 150(a-n) that then drives each of the corresponding hydraulic pumps 160(a-n) to continuously pump the fracking media into the well to execute the fracking operation to extract the fluid from the well when the electric power 360 at the power generation voltage level is provided to the single VFDs 340(a-n).

For example, the single VFDs 340(a-n) may operate at a reduced capacity when the switchgear transformer configuration 335 provides the electric power 355 at the auxiliary voltage level. In doing so, the single VFDs 340(a-n) may operate in a maintenance mode in which the electric power 355 at the auxiliary voltage level is sufficient for the single VFDs 340(a-n) to spin the single shaft electric motors but not sufficient to drive the single shaft electric motors at the RPM levels that the single shaft electric motors are rated. In operating the single VFDs 340(a-n) in the maintenance mode with the electric power 355 at the auxiliary voltage level, the hydraulic pumps as well as the fracking equipment 370 may be examined and maintenance may be performed on the hydraulic pumps and the fracking equipment 370 to ensure the hydraulic pumps 160(a-n) and the fracking equipment 370 are operating adequately. The VFD controllers 345(a-n) of the single VFDs 340(a-n) may execute the functionality of the single VFDs 340(a-n) when operating in the maintenance mode. The fracking control center 380 may also remotely control the single VFDs 340(a-n) via the communication link 365 to execute the functionality of the single VFDs 340(*a-n*) when operating in the maintenance mode.

In another example, the trailer auxiliary systems 315(*a-n*) may be operated when the single VFDs 340(*a-n*) are operating at the reduced capacity when the switchgear transformer configuration 335 provides the electric power 355 at the auxiliary voltage level. The trailer auxiliary systems 315(*a-n*) may be auxiliary systems positioned on the pump trailers 330(*a-n*) and/or included in the single VFDs 340(*a-n*) such that auxiliary operations may be performed on the single VFDs 340(*a-n*), the single shaft electric motors, and/or the single hydraulic pumps to assist in the maintenance and/or operation of the single VFDs 340(*a-n*) the single shaft electric motors and/or single hydraulic pumps when the electric power 355 at the auxiliary voltage level is provided to the single VFDs 340(*a-n*). For example, the trailer auxiliary systems 315(*a-n*) may include but are not limited to motor blower systems, the lube oil controls, oil heaters, VFD fans, and/or any other type of auxiliary system that is positioned on the pump trailers 330(*a-n*) and/or included in the single VFDs 340(*a-n*) to assist in the maintenance and/or operation of the single VFDs 340(*a-n*), single shaft electric motors, and/or single hydraulic pumps that will be apparent to those skilled in the relevant art(s) without departing from the spirit and scope of the disclosure.

In an embodiment, each of the single VFDs 340(*a-n*) may include a transformer (not shown) also positioned on the single trailers 330(*a-n*) that may generate the electric power 355 at the auxiliary voltage level. Rather than have the switchgear transformer configuration 335 distribute the electric power 355 at the auxiliary voltage level to each of the single VFDs 340(*a-n*), each of the transformers may be able to generate the electric power 355 at the auxiliary voltage level such that each of the features discussed in detail above that are operated due to the electric power 355 at the auxiliary voltage level may be performed by the electric power 355 at the auxiliary voltage level as generated by each of the transformers. As a result, cabling between the power distribution trailer 320 and each of the single VFDs 340(*a-n*) may be reduced due to no longer requiring the cabling to propagate the electric power 355 at the auxiliary voltage level from the switchgear transformer configuration 335 to each of the single VFDs 340(*a-n*).

Parameter Monitoring and Control

In an embodiment, the controls for each of the trailer auxiliary systems 315(*a-n*) may be embedded in the single VFDs 340(*a-n*) such that the VFD controllers 345(*a-n*) may control each of the trailer auxiliary systems 315(*a-n*) with the sophisticated control system included in each of the single VFDs 340(*a-n*). However, the fracking control center 380 may also control each of the trailer auxiliary systems 315(*a-n*) based on the communication link 365 in that the fracking control center 380 may hook into the controls for each of the trailer auxiliary systems 315(*a-n*) that may be embedded in the single VFDs 340(*a-n*) and control each of the trailer auxiliary systems 315(*a-n*) remotely. In doing so, the data map of the fracking control center 380 may be mapped to the controls for each of the trailer auxiliary systems 315(*a-n*) embedded in the single VFDs 340(*a-n*) providing the single VFDs 340(*a-n*) with the modularity to be easily externally controlled by any fracking control center 380 positioned at the fracking site and/or positioned remote from the fracking site.

For example, the fracking control center 380 may request to activate the lubrication pumps included in the trailer auxiliary systems 315(*a-n*) positioned on the pump trailers 330(*a-n*). The fracking control center 380 may simply activate the lube bit at the fracking control center 380 to activate the lubrication pumps to lube the single hydraulic pumps positioned on the pump trailers 330(*a-n*). The command then cascades down from the fracking control center 380 to the VFD controls 345(*a-n*) for the lubrication pumps embedded in the single VFDs 340(*a-n*) via the communication link 365 and enables the fracking control center 380 to remotely activate the lubrication pumps to initiate circulating oil throughout the single hydraulic pumps.

The VFD controllers 345(*a-n*) associated with each single VFD 340(*a-n*) may automatically adjust the trailer auxiliary systems 315(*a-n*) based on parameters monitored by the VFD controllers 345(*a-n*) in real-time as the single hydraulic pumps are continuously pumping the fracking media into the well to execute the fracking operation to prepare the well for the later extraction of the fluid from the well. Real-time is the state of the parameters monitored by the VFD controllers 345(*a-n*) as triggered by the operation of the electric driven hydraulic fracking system 100 as the hydraulic pumps 160(*a-n*) continuously pump the fracking media into the well to execute the fracking operation. As the single hydraulic pumps 160(*a-n*) are continuously pumping the fracking media into the well to execute the fracking operation to prepare the well for the later extraction of the fluid from the well, several different parameters may be continuously monitored by the single VFDs 340(*a-n*) to determine whether the different parameters exceed and/or decrease below thresholds that may be indicative that the single VFDs 340(*a-n*) may have to execute a corrective action to restore the different parameters to an adequate level. The single VFDs 340(*a-n*) may then automatically execute the corrective actions to restore the different parameters to an adequate level and in doing so may prevent damage to any of the components of the electric driven fracking system 300 and/or a halt in the fracking operation.

For example, the VFD controllers 345(*a-n*) may monitor the temperature of the single VFDs 340(*a-n*), the single hydraulic pumps, and the single shaft electric motors to determine whether the temperature exceeds a temperature threshold in real-time. The temperature threshold may be indicative that the temperature of the single VFDs 340(*a-n*), the single shaft electric motors, and/or the single hydraulic pumps may be increasing and indicative that a corrective action in cooling the temperature of the single VFDs 340 (*a-n*), the single shaft electric motors, and/or the single hydraulic pumps may be required to ensure that damage is not inflicted onto the single VFDs 340(*a-n*), the single shaft electric motors, and/or the single hydraulic pumps resulting in a halting of the fracking operation. Thus, the VFD controllers 345(*a-n*) may then in real-time activate the fans positioned on the pump trailers 330(*a-n*) to decrease the temperature of the single VFDs 340(*a-n*), the single shaft electric motors, and/or the single hydraulic pumps. In doing so, the VFD controllers 345(*a-n*) may prevent damage to the single VFDs 340(*a-n*), the single shaft electric motors, and/or the single hydraulic pumps by cooling each appropriately by activating the fans when the temperature increased above the temperature threshold.

In another example, the VFD controllers 345(*a-n*) may monitor the pressure at the well head of the well as the fracking media is continuously injected into the well to determine whether the pressure of the fracking media exceeds a pressure threshold. The pressure threshold may be a regulatory threshold in that when the pressure of the fracking media at the well head in the well exceeds the pressure threshold, such as 15000 PSI, then the iron is required to be pulled out of the well based on regulation requirements such that the iron may be replaced and/or examined for any cracks and recertified. Such a halt in the fracking operation may significantly delay the fracking operation as well as significantly increase the cost. Thus, the VFD controllers 345(*a-n*) may monitor the pressure at the well head of the well in real-time to determine whether the pressure exceeds the pressure threshold. The VFD controllers 345(*a-n*) may then execute a corrective action when the pressure exceeds the pressure threshold.

In an embodiment, the single VFDs 340(*a-n*) may execute a dual frequency injection into the single shaft electric motors to produce a moderate braking effect on the single shaft electric motors when an unloaded motor needs to be stopped as quickly as possible. In another embodiment, a contactor may connect to a resistor such that the flux on the single shaft electric motor is maintained. The single VFDs 340(*a-n*) may then transition the resistor across the line to facilitate a rapid decrease the RPM level of the single shaft electric motor when an unloaded motor needs to be stopped as quickly as possible. In another embodiment, the fracking control center 380 may remotely activate a clutch that may be installed between the single shaft electric motor and single hydraulic pump such that the fracking control center 380 may release the clutch to disengage the single shaft electric motor from the single hydraulic pump to enable the single hydraulic pump to decrease the HP level to disconnect the inertial forces an unloaded motor from continuing to drive the single hydraulic pump 160(*a-n*) when the single hydraulic pump 160(*a-n*) needs to be stopped as quickly as possible.

The single VFDs 340(*a-n*) may monitor any type of operation parameter such as but not limited to pressure change of the fluid flowing through the single hydraulic pump, flow rate, volume, temperature, pump efficiency, viscosity, thermal properties, Reynolds number, and/or any other type of parameter that may be indicative as to whether a corrective action should be executed to prevent damage to any component of the electric driven hydraulic fracking system 300 and/or to halt to fracking operation that will be apparent to those skilled in the relevant art(s) without departing from the spirit and scope of the disclosure.

Figure 4:
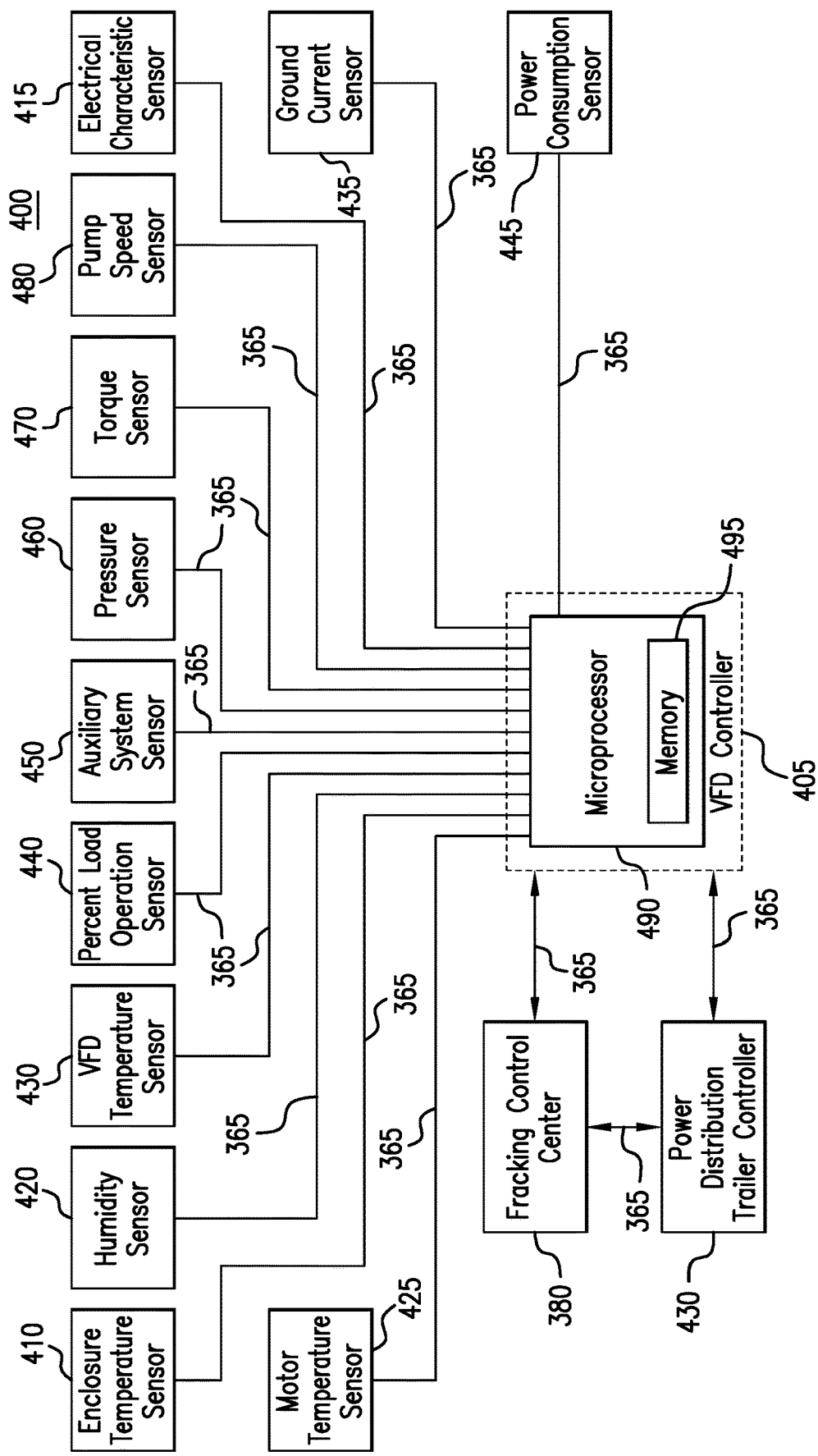
FIG. 4 illustrates a block diagram of an electric driven fracking system where the VFD controller, the fracking control center, and/or the power distribution trailer controller monitors various operation parameters associated with the operation of the electric driven fracking system.

FIG. 4 illustrates a block diagram of an electric driven fracking system 400 where the VFD controller, the fracking control center 380, and/or the power distribution trailer controller 430 monitors various operation parameters associated with the operation of the electric driven fracking system 400. The VFD controller 405, the fracking control center 380, and/or the power distribution trailer controller 430 may then automatically execute corrective actions in response to the monitored operation parameters. In doing so, the VFD controller 405, the fracking control center 380, and/or power distribution trailer controller 430 may continuously monitor the operation parameters and execute corrective actions in real-time when necessary to maintain the operation parameters within their corresponding operation parameter thresholds to maintain the operation of the electric driven fracking system 400. The electric driven fracking system 400 shares many similar features with the hydraulic fracking operation 100, the single pump configuration 200, and the electric driven hydraulic fracking system 300; therefore, only the differences between the electric driven hydraulic fracking system 400 and the hydraulic fracking operation 100, the single pump configuration 200, and the electric driven hydraulic fracking system 300 are to be discussed in further detail.

In one embodiment of the present disclosure, the VFD controller 405, the fracking control center 380, and/or the power distribution trailer controller 430 may connect and/or communicate with via communication link 365 and/or wireless communication to one or more modules that when commands are received by the VFD controller 405, the fracking control center 380, and/or the power distribution trailer controller 430, a corrective action is initiated based on the monitoring of operation parameters by each of the modules to maintain the operation parameters within the corresponding operation thresholds to maintain the operation of the electric driven hydraulic fracking system 400. The one or more modules motor temperature sensor 425, the enclosure temperature sensor 410, the humidity sensor 420, the VFD temperature sensor 430, the percent load operation sensor 440, the auxiliary system sensor 450, the pressure sensor 460, the torque sensor 470, the pump speed sensor 480, the electrical characteristic sensor 415, the ground current sensor 435, and the power consumption sensor 445 and/or any other module that may monitor operation parameters of the electric driven hydraulic fracking system to maintain the operation of the electric driven hydraulic fracking system that will be apparent to those skilled in the relevant art(s) without departing from the spirit and scope of the disclosure.

The VFD controller 405 includes a microprocessor 480 and a memory 495 and may be referred to as a computing device or simply "computer". For example, the VFD controller 405 may be workstation, mobile device, computer, cluster of computers, remote cloud service, set-top box, or other computing device. In one embodiment of the present invention, multiple modules may be implemented on the same computing device. Such a computing device may include software, firmware, hardware, or a combination thereof. Software may include one or more applications on an operating system. Hardware can include, but is not to be limited to, the microprocessor 290 and/or the memory 295.

The fracking control center 380 also includes a microprocessor (not shown) and a memory (not shown) and may be referred to as a computing device or simply "computer". For example, the fracking control center 380 may be workstation, mobile device, computer, cluster of computers, remote cloud service, set-top box, or other computing device. In one embodiment of the present invention, multiple modules may be implemented on the same computing device. Such a computing device may include software, firmware, hardware, or a combination thereof. Software may include one or more applications on an operating system. Hardware can include, but is not to be limited to, the microprocessor and/or the memory.

The power distribution trailer controller 430 also includes a microprocessor (not shown) and a memory (not shown) and may be referred to as a computing device or simply "computer". For example, the power distribution trailer controller 430 may be a workstation, mobile device, computer, cluster of computers, remote cloud service, set-top box, or other computing device. In one embodiment of the present invention, multiple modules may be implemented on the same computing device. Such a computing device may include software, firmware, hardware, or a combination thereof. Software may include one or more applications on an operating system. Hardware can include, but is not to be limited to, the microprocessor and/or the memory.

The VFD controller 405, the fracking control center 380, and/or the power distribution trailer controller 430 may communication with each of the motor temperature sensor 425, the enclosure temperature sensor 410, the humidity sensor 420, the VFD temperature sensor 430, the percent load operation sensor 440, the auxiliary system sensor 450, the pressure sensor 460, the torque sensor 470, the pump speed sensor 480, the electrical characteristic sensor 415, the ground current sensor 435, and the power consumption sensor 445. The communication between the VFD controller, the fracking control center 380, and/or the power distribution trailer controller 430 occurs via the communication link 365.

As noted above, the communication between all components included in the electric driven hydraulic fracking system 400 may occur via the VFD controller 405, the fracking control center 380, and/or the power distribution trailer controller 430 based on the communication link 365 between the VFD controller 405, the fracking control center 380, and/or the power distribution trailer controller 430 and each corresponding component. The communication link 365 may be embodied via wireless and/or wired connection communication. For example, wireless communication via the communication link 365 may occur via one or more networks 105 such as the internet or Wi-Fi wireless access points (WAP. In some embodiments, the network 105 may include one or more wide area networks (WAN) or local area networks (LAN). The network may utilize one or more network technologies such as Ethernet, Fast Ethernet, Gigabit Ethernet, virtual private network (VPN), remote VPN access, a variant of IEEE 802.11 standard such as Wi-Fi, and the like. Communication over the network 105 takes place using one or more network communication protocols including reliable streaming protocols such as transmission control protocol (TCP), Ethernet, Modbus, CanBus, EtherCAT, ProfiNET, and/or any other type of network communication protocol that will be apparent from those skilled in the relevant art(s) without departing from the spirit and scope of the present disclosure. Wired connection communication via the communication link 365 may occur but is not limited to a fiber optic connection, a coaxial cable connection, a copper cable connection, and/or any other type of direct wired connection that will be apparent from those skilled in the relevant art(s) without departing from the spirit and scope of the present disclosure. These examples are illustrative and not intended to limit the present disclosure.

For simplicity of discussion, the following discussion regarding the monitoring of operation parameters and the subsequent execution of corrective action to maintain the operation parameters within the operation threshold to maintain the operation of the electric driven hydraulic fracking system 400 is to be discussed with regard to the VFD controller 405. However, any of the below discussion may be substituted via the fracking control center 380, and/or the power distribution trailer controller 430. The VFD controller 405, the fracking control center 380, and the power distribution trailer controller 430 provide a conduit of data associated with the monitoring of operation parameters with each other via communication link 365 such that any data obtained and/or monitored by the VFD controller 405, the fracking control center 380 and/or the power distribution trailer controller 430 may then be automatically provided to each of the VFD controller 405, the fracking control center 380, and/or the power distribution trailer controller 430 via the communication link 365. In doing so any of the VFD controller 405, the fracking control center 380, and/or the power distribution controller 430 may executed the necessary corrective action to maintain each operation parameter within the corresponding operation threshold to maintain the operation of the electric driven hydraulic fracking system 400.

The VFD controller 405 may monitor a plurality of operation parameters associated with an operation of the electric driven hydraulic fracking system 400 as each component of the electric driven hydraulic fracking system 400 operates to determine whether at least one operation parameter deviates beyond at least one corresponding operation parameter threshold. Each of the operation parameters provides an indicator as to an operation status of a corresponding component of the electric driven hydraulic fracking system 400. Each operation parameter provides insight to the VFD controller 405 as to the how the corresponding component that the operation parameter is monitoring is operating. The electric driven hydraulic fracking system 400 may include numerous components with each component operating and contributing to the operation of the electric driven hydraulic fracking system 400. With such numerous components operating and contributing to the operation of the electric driven hydraulic fracking system 400, any operation of such component that begins to deviate beyond the corresponding operation threshold may result in a significant increase in disturbance in the operation and/or damage to the electric hydraulic fracking system 400. Any such disturbance in the operation and and/or damage to the electric hydraulic fracking system 400 may result in the significant amounts of money lost by the operating entity of the electric hydraulic fracking system 400 if the electric hydraulic fracking system is required to shut down.

The operation threshold is the operation threshold for each component included in the electric hydraulic fracking system 400 that when deviated from may result in a significant increase in risk that the operation of the component may result in a disturbance in the operation and/or cause damage to the electric hydraulic fracking system 400 thereby jeopardizing the operation of the electric hydraulic fracking system 400. The VFD controller 405 may initiate at least one corrective action when each operating parameter deviates beyond the at least one corresponding operation threshold. Initiating the corrective action when each operation parameter deviates beyond the at least one corresponding operation threshold maintains the operation of the electric driven hydraulic fracking system 400.

The corrective action may be an action launched by the VFD controller 405 in response to the operation parameter deviating from the corresponding operation threshold to maintain the operation of the electric driven hydraulic fracking system 400 without any disruption and/or any damage to the electric driven hydraulic fracking system 400. In doing so, the corrective action launched by the VFD controller 405 in response to the operation parameter deviating from the corresponding operation threshold may neutralize any potential impact to the disruption of the operation and/or damage to the electric driven hydraulic fracking system 400 to maintain the operation of the electric driven hydraulic fracking system 400 such that the electric driven hydraulic fracking system 400 is not required to be shut down.

For example, a motor temperature sensor 425 may be positioned on the single pump trailer and may monitor the operation parameter of motor temperature of the component of the single shaft electric motor that is positioned on the single pump trailer. The VFD controller 405 may monitor the motor temperature of the single shaft electric motor as the single shaft electric motor operates to determine if the motor temperature increases beyond the operation threshold. An increase of the motor temperature beyond the operation threshold is indicative that the operation of the single shaft electric motor is becoming significantly hot and that the performance of the single shaft electric motor may be negatively impacted and/or damaged such as shutting down. Such a significant negative impact to the single shaft electric motor may have significant disruption in the electric driven hydraulic fracking system 400 with the single shaft electric motor failing to adequately operate. In an embodiment, the VFD controller 405 may execute the corrective action to automatically shut the single shaft electric motor when the motor temperature measured by the motor temperature sensor 425 increases beyond the operation threshold to thereby prevent the negatively impacted single shaft electric motor from damaging other components included in the electric driven hydraulic fracking system 400.

However, automatically shutting down the single shaft electric motor when the single motor temperature sensor 425 measures the motor temperature that exceeds the operation threshold may also result the shutting down of the complete electric driven hydraulic fracking system 400. Such a complete shutdown of the electric driven hydraulic fracking system 400 may result in a significant amount of money lost by the operating entity during the complete shutdown of the electric driven hydraulic fracking system 400. Further, the increased motor temperature that exceeds the operation threshold by the motor temperature sensor 425 may be due to the motor temperature sensor 425 failing to operate correctly. In such an example, the increase in the motor temperature beyond the operation threshold is not due to the negative operation of the single shaft electric motor but the motor temperature sensor 425.

Rather than automatically shutting down the single shaft electric motor by the VFD controller 405 when the motor temperature measured by the motor temperature sensor 425 exceeds the operation threshold, in an embodiment, the VFD controller 405 may execute the corrective action to funnel that data to the fracking control center 380. The fracking control center 380 may determine that the motor temperature of the single shaft electric motor measured by the motor temperature sensor 425 is 200° C. However, the motor temperature measured by other motor temperature sensors positioned on the single pump trailer of the single shaft electric motor may be 50° C. The fracking control center 380 may determine that the motor temperature sensor 425 is negatively operating and not the single shaft electric motor. As a result, the fracking control center 380 may execute the corrective action to override the motor temperature sensor 425 and maintain full operation of the single shaft electric motor thereby maintaining full operation of the electric driven hydraulic fracking system 400 rather than shut down the electric driven hydraulic fracking system 400 simply due to the negative operation of the motor temperature sensor 425.

The components of the electric driven hydraulic fracking system 400 that the VFD controller 405, fracking control center 380, and/or power distribution trailer controller 430 may monitor may include but is not limited to the fracking control center, auxiliary systems, the power generation system, the power distribution trailer controller, switchgears, the auxiliary system transformer, the additional system transformer, the additional systems, the black start generator, the single VFDs, VFD controllers, trailer auxiliary systems, the fracking equipment and/or any other component included in the electric driven hydraulic fracking system 400 that will be apparent to those skilled in the relevant art(s) without departing from the spirit and scope of the disclosure.

The enclosure temperature sensor 410 may include one or more sensors positioned inside the enclosure of the single pump trailer. The enclosure temperature sensor 410 may monitor the operation parameter of the temperature inside the enclosure to ensure that temperature is within the operation temperature threshold to enable the components also positioned in the enclosure to operate correctly. The enclosure temperature sensor 410 may measure the temperature to ensure that the temperature of different components positioned in the enclosure does not exceed the operation threshold. For example, enclosure temperature sensor 410 may monitor the temperature of a bearing and the may increase in temperature beyond the temperature threshold. The VFD controller 405 may determine that such an increase in the temperature of the bearing may cause damage to the single shaft electric motor and thus the VFD controller 405 may execute the corrective action to deactivate the bearing.

In another example, the enclosure temperature sensor 410 may measure the temperature of the enclosure such that the VFD controller 405 may ensure that the enclosure temperature does not decrease below the operation threshold of 32 degrees F. The single VFD may not be activated when the temperature of the enclosure is below 32 degrees F. The VFD controller 405 may then execute the corrective action of activating the trailer auxiliary heaters as well as the trailer auxiliary fans circulate the heated air to increase the temperature of the enclosure back into the operation threshold of above 32 degrees F. In another example, the humidity sensor 420 may measure the operation parameter of the moisture present in the enclosure. The activation of the electric power 360 at the power generation voltage level to the singe VFD may negative impact the operation of the single VFD when the moisture present in the enclosure exceeds the operation threshold. The VFD controller 405 may execute the corrective action to activate the trailer auxiliary fans to dry the moisture present in the enclosure to decrease the moisture below the operation threshold.

In another example, the VFD temperature sensor 430 may monitor the temperature of the single VFD such that the VFD controller 405 may ensure that the temperature of the single VFD remains below the operation threshold. As the temperature of the single VFD increases above the operation threshold, the VFD controller 405 may execute the corrective action to deactivate the single VFD to prevent damage to the single VFD. In another example, the VFD controller 405 may execute the corrective action to phase back the operation of the single VFD to a phase back threshold such that the phasing back the operation of the single VFD decreases the temperature of the single VFD to below the operation threshold. In such an example, the VFD controller 405 may phase back the operation of the single VFD to 75% to allow the single VFD to cool to below the operation threshold for the VFD temperature.

The VFD controller 405 may also execute the corrective action with regard to dynamically adjusting the speed of the trailer auxiliary fans such that the trailer auxiliary fans may be dynamically adjusted by the VFD controller 405 based on the temperature of the enclosure as well as the percentage of load that the electric driven hydraulic fracking system 400 is operating. In doing so, the VFD controller 405 may dynamically account for the current temperature of the enclosure as well as the percentage of load that the electric driven hydraulic fracking system 400 is operating to avoid unnecessarily running the trailer auxiliary fans at increased speeds when such cooling is not necessary and thereby running the trailer auxiliary fans at increased speeds results in an unnecessary consumption of energy. However, the VFD controller 405 may also dynamically increase the speed of the trailer auxiliary fans when the temperature of the enclosure and the percentage of load the electric driven hydraulic fracking system 400 is operating results in an increase in the temperature of the components of the single pump trailer thereby requiring a dynamic increase in the speed of the trailer auxiliary fans to cool the components to prevent damage to the components.

The percentage of load of operation of the electric driven hydraulic fracking system 400 may drastically increase and/or decrease throughout operation. Often times, the electric driven hydraulic fracking system 400 may not operate continuously at the full percentage of operation for two weeks. Rather, the percentage of load operation may increase to 100% for an operation of two hours and then decrease to an operation of 15% for two hours. Rather than have the VFD temperature cycle drastically with the drastic cycling of the percentage of load of operation of the electric driven hydraulic fracking system 400 which negatively impacts the single VFD, the VFD controller 405 may dynamically monitor the temperature of the enclosure as well as the percentage of load operation to dynamically adjust the trailer auxiliary fans to maintain the VFD temperature within the VFD threshold. For example, the VFD controller 405 may determine that the outside temperature of 32 degrees F. and the decrease in the percentage of load operation of the electric driven hydraulic fracking system 400 requires that the enclosure heaters be activated and the speed of the trailer auxiliary fans be increased to maintain the temperature of the VFD at the operation threshold of 85 degrees to prevent the VFD temperature from decreasing due the temperature outside and the significant decrease in the load of operation of the electric driven hydraulic fracking system 400.

The VFD controller 405 may execute the corrective action of activating the trailer auxiliary heater when the enclosure temperature sensor 410 measures the decrease in the enclosure temperature below the operation threshold. In doing so, components positioned in the enclosure may increase in temperature to the operation threshold and the moisture of the enclosure may be decreased to the operation threshold.

The VFD controller 405 may also monitor the numerous different auxiliary systems that are included in the electric driven hydraulic fracking system 400. The VFD controller 405 may monitor numerous different operation parameters associated with the numerous different auxiliary systems. The VFD controller 405 may then execute numerous different corrective actions when any of the numerous different operation parameters deviate from the corresponding operation thresholds to maintain the operation of the numerous different auxiliary systems within the corresponding operation thresholds. For example, the VFD controller 405 may execute the corrective action of heating the different auxiliary systems when the operation parameter of temperature of the different auxiliary systems decreases below the operation threshold. The VFD controller 405 may execute the corrective action of cooling the different auxiliary systems when the operation parameter of temperature of the different auxiliary systems increases above the operation threshold. The VFD controller 405 may monitor the operation parameters of pressure and/or flow control of the different auxiliary systems. The VFD controller 405 may dynamically adjust the speed of the different auxiliary systems based on the operation parameters.

FIG. 5 illustrates a block diagram of an electric driven hydraulic fracking system 500 that further describes the interaction between the power distribution trailer 320 and the VFD controllers 505($a$-$n$), n is an integer that equals the quantity of single VFDs 340($a$-$n$). The power distribution trailer 320 includes the switchgear configuration 310, a plurality of feeders, where n is an integer that equals the quantity of VFD connections 550($a$-$n$), the power distribution trailer controller 430, and the auxiliary system transformer 510. Each single hydraulic trailer 330($a$-$n$) includes a single VFD 340($a$-$n$) and a VFD controller 505($a$-$n$) positioned on the single hydraulic trailer 330($a$-$n$) and each single VFD 340($a$-$n$) includes a VFD connection 550($a$-$n$), where n is an integer that equals the quantity of feeders 530($a$-$n$). The electric driven hydraulic fracking system 500 shares many similar features with the hydraulic fracking operation 100, the single pump configuration 200, the electric driven hydraulic fracking system 300, and the electric driven hydraulic fracking system 400; therefore, on the differences between the electric driven hydraulic fracking system 500 and the hydraulic fracking operation 100, the single pump configuration 200, the electric driven hydraulic fracking system 300, and the electric driven hydraulic fracking system 400 are to be discussed in further detail.

The VFD controller 505($a$-$n$) may monitor the operation parameters associated with the operation of the components associated with single pump trailer 330($a$-$n$) based on polling a corresponding switchgear 325($a$-$n$) included in the switchgear configuration 305 positioned on the power distribution trailer 320 that is electrically connected to the VFD connection 550($a$-$n$) of the single VFD 340($a$-$n$) positioned on the single pump trailer 330($a$-$n$). The VFD controller 505($a$-$n$) may initiate at least one corrective action when each operation parameter associated with the operation of components associated with the single pump trailer 330($a$-$n$) deviates beyond the at least one corresponding operation threshold. The VFD controller 505($a$-$n$) initiates the at least one corrective action when each operation parameter deviates beyond the at least one corresponding operation threshold maintains the operation of the electric driven hydraulic fracking system 500.

The VFD controller 505($a$-$n$) may continuously poll the corresponding switchgear 325($a$-$n$) included in the switchgear configuration 305 via the communication link 365. In doing so, the VFD controller 505($a$-$n$) may monitor numerous operation parameters associated with the corresponding switchgear 325($a$-$n$). For example, the VFD controller 505 ($a$-$n$) may know the amount of electric power that is currently propagating out to the single shaft electric motor associated with VFD controller 505($a$-$n$) and the single hydraulic trailer 330($a$-$n$). The VFD controller 505($a$-$n$) may know the amount of current that is currently propagating to the single shaft electric motor. The VFD controller 505($a$-$n$) may know the voltage level of the electric power that is currently propagating to the single shaft electric motor. The VFD controller 505($a$-$n$) may know the power factor of the electric power currently propagating to the single shaft electric motor. The VFD controller 505($a$-$n$) may then execute a corrective action when any of the operation parameters deviate from the operation threshold.

Returning to FIG. 4, the VFD controller 405 may instruct the single VFD 340($a$-$n$) to increase pressure to a pump pressure threshold based on the operating parameter of pressure measured by the pressure sensor 460 and maintain the pressure applied to the single hydraulic pump at the pump pressure threshold before the electric driven hydraulic fracking system 400 executes a fracking operation to determine whether leaks are present in the pump. The pressure applied to the single hydraulic pump at the pump pressure threshold identifies whether leaks are present in the pump. The VFD controller 405 may instruct the single VFD 340($a$-$n$) to apply the operating parameter of torque to the single hydraulic pump at a torque threshold based on the operating parameter of torque measured by the torque sensor 470. The torque applied at the torque threshold to the single hydraulic pump prevents the pressure applied to the single hydraulic pump from reaching a pressure damage threshold when reached damages the single hydraulic pump. The VFD controller 405 may monitor the pressure applied to the single hydraulic pump to determine if the pressure gradually increases towards the pressure damage threshold. The VFD controller 405 may execute the corrective action of deactivating the single hydraulic pump when the pressure gradually increases towards the pressure damage threshold that is indicative of leaks present in the pump.

The operating entity of the electric driven hydraulic fracking system 400 may request to test whether leaks are present in the single hydraulic pump. Pressure may be applied to the single hydraulic pump and then the water may bleed down into the well should leaks exist in the single hydraulic pump. In order to test the single hydraulic pump as to whether the single hydraulic pump includes leaks before single hydraulic pump engages in the operation of the electric driven hydraulic fracking system 400, the VFD controller 405 may increase the pressure on the single hydraulic pump to the pump pressure threshold. The VFD controller 405 may then instruct the single hydraulic pump to execute a positive displacement. The VFD controller 405 may then monitor the pressure to determine if the pressure spikes. Based on the positive displacement of the single hydraulic pump, water may be incompressible if the single hydraulic pump does not include any leaks as the water may have no outlet from the single hydraulic pump if the single hydraulic pump does not include any leaks resulting in a significant increase in pressure. However, if the single hydraulic pump does include leaks, then the water may be released into the well and the pressure of the single hydraulic pump may not significantly increase.

However, the significant increase in pressure to the pressure damage threshold may significantly damage the single hydraulic pump when such an increase in pressure is the result of testing the single hydraulic pump for leaks and the single hydraulic pump passes with the increase in pressure. In order to prevent damage to the single hydraulic pump due to the increase in pressure, the VFD controller 405 may apply torque to the single hydraulic pump at the torque threshold. In applying by the VFD controller 405 the torque to the single hydraulic pump at the torque threshold may prevent the pressure of the single hydraulic pump from spiking quickly to the pressure damage threshold that when exceeded may significantly damage the single hydraulic pump. Rather the VFD controller 405 may monitor the pressure to determine the current status of the pressure relative to the pressure damage threshold and then may execute the corrective action of adjusting the torque applied to the single hydraulic pump to control the increase in the pressure as a linear reaction towards the pressure damage threshold rather than a spike beyond the pressure damage threshold. In doing so, the single hydraulic pump may be tested for leaks without damaging the single hydraulic pump.

Often times, the electric driven hydraulic fracking system 400 may initiate the fracking operation without having all of the single hydraulic pumps operation at the start. However, during the operation of the electric driven hydraulic fracking system 400, the remaining single hydraulic pumps that were initially inactive may require to be activated such that the electric driven hydraulic fracking system 400 may continue the fracking operation with each of the single hydraulic pumps operating at full capacity. Often times each of the single hydraulic pumps may be connected to a single pipe and the single hydraulic pumps in operation may be working at similar pressure and flow rates. However, to then activate a single hydraulic pump and increase the single hydraulic pump to full capacity may negatively impact the operation of the already active single hydraulic pumps.

Rather the inactive single hydraulic pump is to be initially generated at a constant torque and at a decreased speed and then ramped up to then be synchronized with the already active single hydraulic pumps. In doing so, the VFD controller 405 may apply constant torque to the newly activated single hydraulic pump and then may initially start the single hydraulic pump at a decreased speed. The VFD controller 405 may monitor the operation parameter of the pump speed of the single hydraulic pump based on the pump speed measured by the pump speed sensor 480. The VFD controller 405 may then continue to monitor the pump speed measured by the pump speed sensor 480 and gradually ramp up the pump speed of the single hydraulic pump until each of the single hydraulic pumps are operating in-line and synchronized.

The VFD controller 405 may generate a grounding current that measures a plurality of electrical characteristics associated with a grounding system for a plurality of electrical connections that are included with the components that are associated with the single pump trailer 330(*a-n*). The VFD controller 405 may determine whether at least one electrical characteristic deviates from when the electrical characteristics were initially measured by the ground current. The VFD controller 405 may generate an alert when at least one electrical characteristic deviates from when the electrical characteristics were initially measured by the ground current. The deviation from the at least one electrical characteristic is indicative that the ground system for the electrical connections that are included with the components that are associated with the single pump trailer is changed.

Each of the numerous components that are electrically connected to the VFD controller 405, such as the single VFD 340(*a-n*), the trailer auxiliary systems 315(*a-n*), the single shaft electric motor, the single hydraulic pump and so on may also be electrically grounded. Each of the numerous components may include electrical connections in which each electrical connection is electrically connected to ground. The single VFD 340(*a-n*) may generate a grounding current such that the grounding current propagates throughout the electrical ground configuration and in doing so propagates through each of the electrical connections for each of the corresponding components that are electrically grounded to the electrical ground configuration. The single VFD 340(*a-n*) may identify the electrical characteristics associated with the grounding current before the single VFD 340(*a-n*) initially propagates the grounding current into the electrical ground configuration.

The single VFD 340(*a-n*) may then monitor the operation parameter of the electrical characteristics associated with the grounding current via the ground current sensor 435. As the VFD controller 340(*a-n*) continues to monitor the electrical characteristics associated with the grounding current via the ground current sensor 435, the VFD controller 340(*a-n*) may determine that the electrical ground configuration continues to maintain each of the numerous components grounded to the electrical ground configuration when the electrical characteristics associated with the grounding current as measured by the ground current sensor 435 are continue to be maintained as when the VFD controller 340(*a-n*) initially propagated the grounding current into the electrical ground configuration. The VFD controller 340(*a-n*) may determine that there is an issue with the electrical ground configuration when the electrical characteristics initially associated with the grounding current before the VFD controller 340(a-n) initially propagates the grounding current into the electrical ground configuration then deviates which is indicative that the electrical ground configuration has changed.

Returning to FIG. 5, the communication link 365 as included in the cables 540(a-n) may provide communication from the VFD connection 550(a-n) to the corresponding feeder 530(a-n) and then to the power distribution trailer controller 430. The communication link 365 may enable the power distribution trailer controller 430 to determine whether the appropriate electric power 360 at the power generation voltage level of 13.8 kV and the appropriate electric power 355 at the auxiliary voltage level of 480V is connected from the appropriate feeder 530(a-n) to the appropriate VFD connection 550(a-n). Often times, installers of the electrical electric driven hydraulic fracking system 500 may incorrectly connect cables 540(a-n) such that the incorrect VFD connection 550(a-n) is connected to the incorrect feeder 530(a-n). In doing so, the incorrect electric power 360 at the power generation voltage level and/or the incorrect electric power 355 at the auxiliary voltage level may be connected to the incorrect single VFD 340(a-n).

For example, the installer in the confusion of installing the electric driven hydraulic fracking system 500 may incorrectly connect cable 540a from feeder 530a to VFD connection 550n. In doing so, the installer connected the incorrect electric power 360 at the power generation voltage level of 13.8 kV and/or the incorrect electric power 355 at the auxiliary voltage level of 480V to the incorrect single VFD 340n via VFD connection 550n. Rather than relying on manual policy and procedure for the installers to verify whether each cable 540(a-n) correctly connects each VFD connection 550(a-n) to each corresponding feeder 530(a-n), the power distribution trailer controller 430 may poll each feeder 530(a-n) and to thereby determine whether each feeder 530(a-n) is connected to the appropriate VFD connection 550(a-n) via the appropriate cable 540(a-n) via the communication link 365 included in each cable 540(a-n). In doing so, the power distribution trailer controller 430 may verify whether each feeder 530(a-n) is connected to the appropriate VFD connection 550(a-n) based on the polling via the communication link 365 included in each cable 540(a-n). The power distribution trailer controller 430 may then confirm that each feeder 530(a-n) is connected to each appropriate VFD connection 550(a-n) when each communication link 365 confirms based on the polling of the power distribution trailer controller 430. The power distribution trailer controller may then generate an alert and identify each feeder 530(a-n) that is connected to the incorrect VFD connection 550(a-n) when the communication link 365 identifies the incorrect connection based on the polling of the power distribution trailer controller 430.

In an embodiment, the VFD controller 505(a-n) may transmit a plug-in signal that originates at a VFD connection 550(a-n) that the VFD controller 505(a-n) is positioned on the single pump trailer with the single VFD 340(a-n) and propagates to a plurality of feeders 530(a-n) associated with a power distribution trailer 320 that is distributing the electric power to the single VFD 540(a-n). The VFD controller 505(a-n) may identify whether a return plug-in signal is received after the plug-in signal is transmitted. The VFD controller 505(a-n) may determine that a cable 540(a-n) is connected to the VFD connection 550(a-n) associated with the corresponding single VFD 340(a-n) and a feeder 530(a-n) associated with the power distribution trailer 320 when the VFD controller 505(a-n) receives the return plug-in signal and that the cable 540(a-n) is not connected to the VFD connection 550(a-n) and the feeder 530(a-n) when the VFD controller 505(a-n) fails to receive the return plug-in signal.

In another embodiment, the VFD controller 505(a-n) may identify a pulse train that is included in the plug-in signal that is received by the VFD controller 505(a-n) when the cable 540(a-n) is connected to the feeder 530(a-n). The VFD controller 505(a-n) may determine the feeder 530(a-n) that the cable 540(a-n) is connected to via the VFD connection 550(a-n) based on the pulse train that is included in the plug-in signal that is received by the VFD controller 505(a-n) and differs from other pulse trains that are associated with other feeders 530(a-n). The VFD controller 505(a-n) may verify the pulse train included in the plug-in signal that is associated with the feeder 530(a-n) that the cable 540(a-n) is correctly conne3 cted to via the VFD connection 550(a-n). The VFD controller 505(a-n) may generate an alert when the pulse train included in the plug-in signal is associated with the feeder 530(a-n) that the cable 540(a-n) is incorrectly connected to via the VFD connection 550(a-n).

Each of the VFD connections 550(a-n) may include an electrical connection for the electric power 360 at the power generation voltage level, an electrical connection for the electric power 355 at the auxiliary power voltage level, and an electrical connection for the communication link 365 Each of the feeders 530(a-n) may also include a corresponding electrical connection for the electric power 360 at the power generation voltage level, an electrical connection for the electric power 355 at the auxiliary power voltage level, and an electrical connection for the communication link 365. Each of the electrical connections at the feeder 530a may generate a first pulse train, each of the electrical connections at the feeder 530b may generate a second pulse train, and each of the electrical connections at the feeder 530n may generate a third pulse train.

The VFD controller 505a understands that the cable for the electrical power 360 at the power generation voltage level, the cable for the electrical power 355 at the auxiliary voltage level, and the cable for the communication link 365 with regard to the VFD connection 550a are to be electrically connected to the feeder 530a. The VFD controller 505a may then poll the feeder 530a for the cable for the electrical power 360 at the power generation voltage level, the cable for the electrical power 355 at the auxiliary voltage level 355, and the communication link 365 as electrically connected to the VFD connection 550a are each also electrically connected to the feeder 530(a-n). In polling the feeder 530a, the VFD controller 505a determines whether the first pulse train associated with the feeder 530a is received at the VFD connection 550a for the cable for the electrical power 360 at the power generation voltage level, the cable for the electrical power 355 at the auxiliary voltage level, and the cable for the communication link 365. If the VFD controller 505a identifies the first pulse train for each of the cable for the electrical power at the power generation voltage level, the cable for the electrical power 355 at the auxiliary voltage level, and the cable for the communication link, the VFD controller 505 may verify that each are correctly electrically connected to the VFD connection 550a and the feeder 530a.

However, if the VFD controller 505a receives a different pulse train than the first pulse train for the electric power 360 at the power generation voltage level, the electric power 355 at the auxiliary voltage level, and/or the communication link, then the VFD controller 505a may determine that whichever cable receives a different pulse train, then that particular cable is not electrically connected to the feeder 530*a*. For example, the VFD controller 505*a* may poll the cable for the electric power 360 at the power generation voltage level, the electric power 355 at the auxiliary voltage level, and the communication link 365 for the first pulse train from the feeder 530*a*. The VFD controller 505*a* may then receive the first pulse train for the electric power 360 at the power generation voltage level and the first pulse train for the electric power 355 at the auxiliary voltage level but the second pulse train for the communication cable 365. The VFD controller 505*a* may then generate an alert identifying that the communication link 365 for the VFD connection 550*a* is incorrectly electrically connected to the feeder 530*b* based on the second pulse train received by the VFD controller 505*a* for the communication link 365.

The VFD controller 505(*a-n*) may monitor a communication pin included in the VFD connection 550(*a-n*) to determine if a communication cable 365 included in the cable 540(*a-n*) is electrically connected to the communication pin included in the VFD connection 550(*a-n*) and a plurality of electric power pins included in the VFD connection 550(*a-n*) to determine if the power cable for the electric power 360 at the power generation voltage level and the electric power 355 at the auxiliary voltage level is electrically connected to the power pins in the VFD connection 550(*a-n*). The VFD controller 505(*a-n*) may instruct a breaker associated with single VFD 340(*a-n*) to transfer from a closed position to an open position when the VFD controller 505(*a-n*) determines that the communication pin included in the VFD connection 550(*a-n*) is not electrically to the communication cable 365 and the power pins are electrically connected to the power cables for the electric power 360 at the power generation voltage level and the electric power 355 at the auxiliary voltage level. A disconnection of the communication cable 365 from the communication pin is indicative that the power cables for the electric power 360 at the power generation voltage level and the electric power 355 at the auxiliary voltage level are being disconnected from the VFD connection 550(*a-n*) with the communication cable 365.

The VFD connection 550(*a-n*) may have a safety feature in that if a user begins to electrically disconnect the cable 540(*a-n*) from the VFD connection 550(*a-n*), the communication cable 365 may lose contact with the communication pin included in the VFD connection 550(*a-n*) before the power cables for the electric power 360 at the power generation voltage level and the electric power 355 at the auxiliary voltage level disconnect from the power pins included in the VFD connection 550(*a-n*). The VFD controller 505(*a-n*) may then have a threshold of time in identifying that the communication cable 365 has lost contact with the communication pin before the power cables lose contact with the power pins. The VFD controller 505(*a-n*) may then instruct a breaker to transfer from a closed position to an open position to deactivate the single VFD 340(*a-n*) before the power cables lose contact with the power pins.

Returning to FIG. 4, the VFD controller 405 may monitor an overall power consumption of the electrical driven hydraulic fracking system 400 as the electrical driven hydraulic fracking system 400 operates to determine if the overall power consumption of the electrical hydraulic fracking system 400 exceeds an overall power threshold. The overall power consumption of the electrical hydraulic fracking system 400 when exceeding the overall power consumption threshold is indicative that the electric power provided to the electrical driven hydraulic fracking system 400 is insufficient to maintain the electrical driven hydraulic fracking system 400 operating at a current state.

In an embodiment, the VFD controller 405 may phase back an operation of the single VFD 340(*a-n*) in driving the single shaft electric motor and the single hydraulic pump to decrease power consumption of the single VFD 340(*a-n*), the single shaft electric motor, and the single hydraulic pump to a phase back threshold. The decreasing of the power consumption of the single VFD, the single shaft electric motor, and the single hydraulic pump to the phase back threshold decreases the overall power consumption of the electrical driven hydraulic fracking system 400 below the overall consumption power threshold. In an embodiment, VFD controller 405 may shutdown the operation of the single VFD 340(*a-n*) in driving the single shaft electric motor and the single shaft hydraulic pump to decrease the power consumption of the single VFD, the single shaft electric motor, and the single hydraulic pump to the phase back threshold to maintain the overall power consumption of the electrical driven hydraulic fracking system 400 below the overall power consumption threshold.

The VFD controller 405 may monitor the operation parameter of the overall power consumption of the single electric driven hydraulic fracking system 400 as the single electric driven hydraulic fracking system 400 conducts the fracking operation based on the overall power consumed as measured by the power consumption sensor 445. If the overall power consumption consumed by the single electric driven hydraulic fracking system 400 exceeds the overall power consumption threshold, then single electric driven hydraulic fracking system 400 may brown out and in doing so may be deactivated from conducting the fracking operation. The amount of time that the single electric driven hydraulic fracking system 400 is in a brown out as well as the time required for the single electric driven hydraulic fracking system 400 to then reboot and ramp back up to conducting the fracking operation may be a significant amount of time resulting in a significant loss in money due to the down time of the electric driven hydraulic fracking system 400 due to the overall power consumed by the electric driven hydraulic fracking system 400 exceeding the overall power consumption threshold.

Rather than brown out, the VFD controller 405 may conduct the corrective action to automatically phase back the operation of the electric driven hydraulic fracking system 400 from full capacity to a partial capacity that then decreases the overall power consumption of the electric driven hydraulic fracking system to below the overall power consumption threshold. For example, the VFD controller 405 may automatically phase back the operation of the electric driven hydraulic fracking system 400 by 25% to decrease the overall power consumption to below the overall power consumption threshold to avoid a brown out. The VFD controller 405 may also conduct the corrective action of identifying components of the electric driven hydraulic fracking system 400 to deactivate while maintaining the remaining components to operate at full capacity to reduce the overall power consumption to below the overall power consumption threshold.

The VFD controller 405 may phase incrementally to determine the appropriate phase back to decrease the overall power consumption below the overall power consumption threshold. For example, the VFD controller 405 may first phase back the operation of the electric driven hydraulic system 400 to 97% of full capacity. The VFD controller 405 may then determine whether the overall power consumption has decreased below the overall power consumption threshold with the phase back to 97% of full capacity. The VFD controller 405 may then phase back the operation of the electric driven hydraulic system 400 to 96% of full capacity and so on until the phase back of the electric driven hydraulic system 400 decreases the overall power consumption to below the overall power consumption threshold In an embodiment, the VFD controller 405 may evaluate a priority table of components should the VFD controller 405 determine that the overall power consumption is increasing above the overall power consumption threshold. The priority table may list each of the components in priority as to the components that the VFD controller 405 is to first deactivate to reduce the overall power consumption to below the overall power consumption threshold. For example, the VFD controller 405 may first deactivate the component listed as the first component to deactivate when the overall power consumption exceeds the overall power consumption threshold. The VFD controller 405 may then determine the overall power threshold as measured power consumption sensor 445 to determine whether the overall power consumption has decreased below the overall power consumption threshold after deactivating the component listed as the first component to be deactivated when the overall power consumption exceeds the overall power consumption threshold. The VFD controller 405 may then deactivate the second component listed in the priority table should the overall power consumption continue to exceed the overall power consumption threshold after deactivating the first component. The VFD controller 405 may then continue to do so until the overall power consumption has decreased below the overall power consumption threshold.

In an embodiment, the VFD controller 405 may evaluate whether there are redundant components operating in that the redundancy in components is not necessary for the electric driven hydraulic fracking system 400 to continue to operate if one of the redundant components is deactivated. In doing so, the VFD controller 405 may recognize that the redundancy in components and may then automatically deactivate one of the redundant components when the overall power consumption increases beyond the overall consumption threshold due the redundant component unnecessarily consuming overall power and is not necessary to the electric driven hydraulic fracking system 400 to continue to operate. For example, the VFD controller 405 may identify that two blenders are operating but only a single blender is required to continue the operation of the electric driven hydraulic fracking system 400. The VFD controller 405 may then automatically deactivate one of the redundant blenders to decrease the overall power consumption to below the overall power consumption threshold.

In an embodiment, the VFD controller 405 may evaluate the capacity of operation for each of the components. The VFD controller 405 may then automatically deactivate the components that are operating at lesser capacity of the similar components to decrease the overall power consumption to below the overall power consumption threshold. For example, the VFD controller 405 may identify that seven single hydraulic pumps are operation and the overall power consumption is increasing above the overall power threshold. The VFD controller 405 may then identify that two of the single hydraulic pumps are running at 40% of capacity and the remaining five single hydraulic pumps are running at 80%. The VFD controller 405 may then automatically deactivate the two single hydraulic pumps that are operating at 40% to decrease the overall power consumption below the overall power consumption threshold.

As noted above, medium voltage cables may propagate the AC voltage signal 360 at the voltage level of 13.8 kV from the power distribution trailer 320 to each of the VFDs 340(*a-n*). Low voltage cables may propagate the auxiliary voltage signal 355 at the auxiliary voltage level of 480V from the power distribution trailer 320 to each of the VFDs 340(*a-n*). Communication cables may propagate communication signals 365 from the power distribution trailer 320 to each of the VFDs 340(*a-n*). FIG. 5 illustrates a top-elevational view of connector configuration for each of the VFDs 340(*a-n*) that may couple to a medium voltage cable, a low voltage cable, and a communication cable.

The connector configuration 500 includes medium voltage connectors 510(*a-b*) with each including a medium voltage plug and receptacle to eliminate the need of skilled personnel to connect the medium voltage cables to the VFDs 340(*a-n*). Rather than using a termination kit with non-shielded cable, the medium voltage connections 510(*a-b*) enable medium voltage cables to be easily connected to the VFDs 340(*a-n*) to propagate the AC voltage signal 360 at the voltage level of 13.8 kV without any risk of shorts and/or nicks in the non-shielded cable. The medium voltage connections 510(*a-b*) include lockable handles that securely connect the medium voltage cables to the medium voltage connections 510(*a-b*) and provide lock out tag out. The low voltage connections 520(*a-b*) provide connections to the low voltage cables that propagate the auxiliary voltage signal 355 at the auxiliary voltage level of 480V to the VFDs 340(*a-n*). The communication connection 530 provides a connection to the communication cable to propagate communication signals 365 to the VFDs 340(*a-n*).

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. An electric driven hydraulic fracking system to pump a fracking media into a well to execute a fracking operation to extract a fluid from the well, comprising:
   a Variable Frequency Drive (VFD) is configured to drive an electric motor that is associated with the VFD to control the operation of the electric motor to drive a hydraulic pump associated with the VFD and the electric motor; and
   a controller associated with the VFD is configured to:
     monitor a plurality of pressure parameters associated with an operation of the electric driven hydraulic fracking system as each component of the electric driven hydraulic fracking system operates to determine whether at least one pressure parameter deviates beyond at least one corresponding pressure parameter threshold, wherein each of the pressure parameters provides an indicator as to an operation status of a corresponding component of the electric driven hydraulic fracking system, and initiate at least one corrected action when each pressure parameter deviates beyond the at least one corresponding pressure parameter threshold, wherein initiating at least one corrected action when each pressure parameter deviates beyond the at least one corresponding pressure parameter threshold maintains the operation of the electric driven hydraulic fracking system.

2. The electric driven hydraulic fracking system of claim 1, wherein the controller is further configured to:

monitor a wellhead pressure parameter of a wellhead associated with a well as a fracking media is continuously injected into the well to determine whether the wellhead pressure parameter associated with a fracking media pressure of the fracking media injected into the well exceeds a fracking media pressure threshold, wherein the fracking media pressure threshold is indicative that the fracking media pressure of the fracking media injected into the well requires a corrective action of decreasing torque generated by the electric motor that drives the hydraulic pump;

automatically decreasing the torque generated by the electric motor that drives the hydraulic pump to decrease the fracking media pressure of the fracking media that is injected into the well to below the fracking media pressure threshold; and automatically increasing the torque generated by the electric motor that drives the hydraulic pump when the fracking media pressure decreases below the fracking media pressure threshold.

3. The electric driven hydraulic fracking system of claim 1, wherein the controller is further configured to:

monitor a pump pressure parameter generated from a leak pressure that is applied to the hydraulic pump as the leak pressure is increased to a pump pressure threshold, wherein the pump pressure parameter generated from the leak pressure that is applied to the hydraulic pump that is increased to the pump pressure threshold is indicative to determine whether leaks are present in the hydraulic pump when the pump pressure parameter generated from the leak pressure applied to the hydraulic pump is increased to the pump pressure threshold;

increase the pump pressure parameter that is generated from the increase in the leak pressure applied to the hydraulic pump to the pump pressure parameter threshold before the electric driven hydraulic fracking system executes the fracking operation; and determine whether leaks are present in the hydraulic pump when the pressure parameter that is generated from the increase in the leak pressure applied to the hydraulic pump is increased to the pump pressure parameter threshold.

4. The electric driven hydraulic fracking system of claim 3, wherein the controller is further configured to:

monitor the pump pressure parameter generated from the leak pressure that is applied to the hydraulic pump as the leak pressure of the hydraulic pump is increased to the pump pressure threshold, wherein the operating pressure parameter generated from the operating pressure of the hydraulic pump that is increased to the pump pressure threshold is indicative to determine whether leaks are present in the hydraulic pump;

instruct the hydraulic pump to execute a positive displacement as the pump pressure parameter generated from the leak pressure that is applied to the hydraulic pump is increased to the pump pressure threshold; and determine whether the pump pressure parameter generated from the leak pressure that is applied to the hydraulic pump increases to a leak pump pressure threshold when the hydraulic pump executes the positive displacement, wherein the pump pressure parameter generated from the leak pressure that is applied to the hydraulic pump when the hydraulic pump executes the positive displacement increases from the pump pressure threshold to the leak pump pressure threshold is indicative of leaks are present in the hydraulic pump and the pump pressure parameter generated from the leak pressure that is applied to the hydraulic pump when the hydraulic pump executes the positive displacement does not increase from the pump pressure threshold to the leak pump pressure threshold is not indicative of leaks that are present in the hydraulic pump.

5. The electric driven hydraulic fracking system of claim 4, wherein the controller is further configured to:

monitor the pump pressure parameter generated from the leak pressure that is applied to the hydraulic pump as the leak pressure of the hydraulic pump is increased to the pump pressure threshold as the hydraulic pump executes the positive displacement;

determine whether the pump pressure parameter generated from the leak pressure that is applied to the hydraulic pump spikes at an increase from the pump pressure threshold to a pressure damage threshold as the hydraulic pump executes the positive displacement, wherein the leak pressure that is applied to the hydraulic pump that spikes at the increase from the pump pressure threshold to the pressure damage threshold as the hydraulic pump executes the positive displacement is indicative of causing damage to the hydraulic pump; and automatically apply torque to the hydraulic pump to a torque threshold as the hydraulic pump executes the positive displacement, wherein the applying of torque to the hydraulic pump at the torque threshold enables the pump pressure parameter generated from the leak pressure that is applied to the hydraulic pump as the leak pressure of the hydraulic pump is increased to the pump pressure threshold as the hydraulic pump executes the positive displacement to decrease below the pressure damage threshold thereby preventing damage to the hydraulic pump.

6. The electric driven hydraulic fracking system of claim 5, wherein the controller is further configured to:

automatically apply torque to the hydraulic pump to the torque threshold to control the increase in the pump pressure parameter generated from the leak pressure that is applied to the hydraulic pump as the hydraulic pump executes the positive displacement to increase the pump pressure parameter in a linear reaction towards the pressure damage threshold and to prevent the increase in the pump pressure parameter from spiking to the pressure damage threshold thereby preventing damage to the hydraulic pump.

7. The electric driven hydraulic fracking system of claim 5, wherein the controller is further configured to:
monitor an operating pump pressure parameter generated from an operating pressure of the hydraulic pump as the hydraulic pump operates to determine whether the operating pressure of the hydraulic pump exceeds a pressure damage threshold thereby indicating whether leaks are present in the hydraulic pump, wherein the pressure damage threshold is indicative that the operating pressure of the hydraulic pump requires a corrective action of applying torque to the hydraulic pump when the operating pressure of the hydraulic pump exceeds the pressure damage threshold to prevent damage to the hydraulic pump as the hydraulic pump operates to determine whether leaks are present in the hydraulic pump;
automatically applying torque to the hydraulic pump to the torque threshold, wherein the applying of torque to the hydraulic pump at the torque threshold enables the operating pump pressure parameter generated from the operating pressure of the hydraulic pump as the hydraulic pump operates to decrease below the pressure damage threshold thereby preventing damage to the hydraulic pump; and
automatically decreasing the torque applied to the hydraulic pump to standard operation when the operating pump pressure parameter generated from the operation pressure of the hydraulic pump as the hydraulic pump operates is below the pressure damage threshold.

8. A method for an electric driven hydraulic fracking system to pump a fracking media into a well to execute a fracking operation to extract fluid from the well, comprising:
driving by a Variable Frequency Drive (VFD) an electric motor that is associated with the VFD to control the operation of the electric motor to drive a hydraulic pump associated with the VFD and the electric motor;
monitoring a plurality of pressure parameters associated with an operation of the electric driven hydraulic fracking system as each component of the electric driven hydraulic fracking system operates to determine whether at least one pressure parameter deviates beyond at least one corresponding pressure parameter threshold, wherein each of the pressure parameters provides an indicator as to an operation status of a corresponding component of the electric driven hydraulic fracking system; and
initiating at least one corrected action when each pressure parameter deviates beyond the at least one corresponding pressure parameter threshold, wherein initiating at least one corrected action when each pressure parameter deviates beyond the at least one corresponding pressure parameter threshold maintains the operation of the electric driven hydraulic fracking system.

9. The method of claim 8, further comprising:
monitoring a wellhead pressure parameter of a wellhead associated with a well as a fracking media is continuously injected into the well to determine whether the wellhead pressure parameter associated with a fracking media pressure of the fracking media injected into the well exceeds a fracking media pressure threshold, wherein the fracking media pressure threshold is indicative that the fracking media pressure of the fracking media injected into the well requires a corrective action of decreasing torque generated by the electric motor that drives the hydraulic pump;
automatically decreasing the torque generated by the electric motor that drives the hydraulic pump to decrease the fracking media pressure of the fracking media that is injected into the well to below the fracking media pressure threshold; and
automatically increasing the torque generated by the electric motor that drives the hydraulic pump when the fracking media pressure decreases below the fracking media pressure threshold.

10. The method of claim 8, further comprising:
monitoring a pump pressure parameter generated from a leak pressure that is applied to the hydraulic pump as the leak pressure is increased to a pump pressure threshold, wherein the pump pressure parameter generated from the leak pressure that is applied to the hydraulic pump that is increased to the pump pressure threshold is indicative to determine whether leaks are present in the hydraulic pump when the pump pressure parameter generated from the leak pressure applied to the hydraulic pump is increased to the pump pressure threshold;
increasing the pump pressure parameter that is generated from the increase in the leak pressure applied to the hydraulic pump to the pump pressure parameter threshold before the electric driven hydraulic fracking system executes the fracking operation; and
determining whether leaks are present in the hydraulic pump when the pressure parameter that is generated from the increase in the leak pressure applied to the hydraulic pump is increased to pump pressure parameter threshold.

11. The method of claim 10, further comprising:
monitoring the pump pressure parameter generated from the leak pressure that is applied to the hydraulic pump as the leak pressure of the hydraulic pump is increased to the pump pressure threshold, wherein the operating pressure parameter generated from the operating pressure of the hydraulic pump that is increased to the pump pressure threshold is indicative to determine whether leaks are present in the hydraulic pump;
instructing the hydraulic pump to execute a positive displacement as the pump pressure parameter generated from the leak pressure that is applied to the hydraulic pump is increased to the pump pressure threshold; and
determining whether the pump pressure parameter generated from the leak pressure that is applied to the hydraulic pump increases to a leak pump pressure threshold when the hydraulic pump executes the positive displacement, wherein the pump pressure parameter generated from the leak pressure that is applied to the hydraulic pump when the hydraulic pump executes the positive displacement increases from the pump pressure threshold to the leak pump pressure threshold is indicative of leaks are present in the hydraulic pump and the pump pressure parameter generated from the leak pressure that is applied to the hydraulic pump when the pump executes the positive displacement does not increase from the pump pressure threshold to the leak pump pressure threshold is not indicative of leaks that are present in the hydraulic pump.

12. The method of claim 11, further comprising:
monitoring the pump pressure parameter generated from the leak pressure that is applied to the hydraulic pump as the leak pressure of the hydraulic pump is increased to the pump pressure threshold as the hydraulic pump executes the positive displacement;
determining whether the pump pressure parameter generated from the leak pressure that is applied to the hydraulic pump spikes at an increase from the pump pressure threshold to a pump pressure damage threshold as the hydraulic pump executes the positive displacement, wherein the leak pressure that is applied to the hydraulic pump that spikes at the increase from the pump pressure threshold to the pressure damage threshold as the hydraulic pump executes the positive displacement is indicative of causing damage to the hydraulic pump; and automatically applying torque to the hydraulic pump to a torque threshold as the hydraulic pump executes the positive displacement, wherein the applying of torque to the hydraulic pump at the torque threshold enables the pump pressure parameter generated from the leak pressure that is applied to the hydraulic pump as the leak pressure of the hydraulic pump is increased to the pump pressure threshold as the hydraulic pump executes the positive displacement to decrease below the pressure damage threshold thereby preventing damage to the hydraulic pump.

13. The method of claim 12, further comprising:
automatically applying torque to the hydraulic pump to the torque threshold to control the increase in the pump pressure parameter generated from the leak pressure that is applied to the hydraulic pump as the hydraulic pump executes the positive displacement to increase the pump pressure parameter in a linear reaction towards the pump pressure damage threshold and to prevent the increase in the pump pressure parameter from spiking to the pressure damage threshold thereby preventing damage to the hydraulic pump.

14. The method of claim 12, further comprising:
monitoring an operating pressure parameter generated from an operating pressure of the hydraulic pump as the hydraulic pump operates to determine whether the operating pressure of the hydraulic pump exceeds a pressure damage threshold thereby indicating whether leaks are present in the hydraulic pump, wherein the pressure damage threshold is indicative that the operating pressure of the hydraulic pump requires a corrective action of applying torque to the hydraulic pump when the operating pressure of the hydraulic pump exceeds the pressure damage threshold to prevent damage to the hydraulic pump as the hydraulic pump operates to determine whether leaks are present in the hydraulic pump;

automatically applying torque to the hydraulic pump to the torque threshold, wherein the applying of torque to the hydraulic pump at the torque threshold enables the operating pump pressure parameter generated from the operating pressure of the hydraulic pump as the hydraulic pump operates to decrease below the pressure damage threshold thereby preventing damage to the hydraulic pump; and automatically decreasing the torque applied to the hydraulic pump to standard operation when the operating pump pressure parameter generated from the operation pressure of the hydraulic pump as the hydraulic pump operates is below the pressure damage threshold.

15. An electric driven hydraulic fracking system to pump a fracking media into a well to execute a fracking operation to extract a fluid from the well, comprising:
a plurality of Variable Frequency Drives (VFDs) is configured to drive a corresponding electric motor to control the operation of each corresponding electric motor to drive a corresponding hydraulic pump associated with each VFD and each electric motor; and a plurality of controllers associated with each corresponding VFD is configured to:
monitor a plurality of pressure parameters associated with an operation of the electric driven hydraulic fracking system as each component of the electric driven hydraulic fracking system operates to determine whether at least one pressure parameter deviates beyond at least one corresponding pressure parameter threshold, wherein each of the pressure parameters provides as an indicator as to an operation status of a corresponding component of the electric driven hydraulic fracking system, and initiate at least one corrected action when each pressure parameter deviates beyond the at least one corresponding pressure parameter threshold, wherein initiating at least one corrected action when each pressure parameter deviates beyond the at least one corresponding pressure parameter threshold maintains the operation of the electric driven hydraulic fracking system.

16. The electric driven hydraulic fracking system of claim 15, wherein each controller is configured to:
monitor a wellhead pressure parameter of a wellhead associated with a well as a fracking media is continuously injected into the well to determine whether the wellhead pressure parameter associated with a fracking media pressure of the fracking media injected into the well exceeds a fracking media pressure threshold, wherein the fracking media pressure threshold is indicative that the fracking media pressure of the fracking media injected into the well requires a corrective action of decreasing torque generated by each corresponding electric motor that drives each corresponding hydraulic pump;

automatically decreasing the torque generated by each corresponding electric motor that drives each corresponding hydraulic pump to decrease the fracking media pressure of the fracking media that is injected into the well to below the fracking media pressure threshold; and automatically increasing the torque generated by each corresponding electric motor that drives each corresponding hydraulic pump when the fracking media pressure decreases below the fracking media pressure threshold.

17. The electric driven hydraulic fracking system of claim 15, wherein each controller is further configured to:
monitor a pump pressure parameter generated from a leak pressure that is applied to each corresponding hydraulic pump as the leak pressure is increased to a pump pressure threshold, wherein the pump pressure parameter generated from the leak pressure that is applied to each corresponding hydraulic pump that is increased to the pump pressure threshold is indicative to determine whether leaks are present in each corresponding hydraulic pump when the pump pressure parameter generated from the leak pressure applied to each corresponding hydraulic pump is increased to the pump pressure threshold;

increase the pump pressure parameter that is generated from the increase in the leak pressure applied to each corresponding hydraulic pump to the pump pressure parameter threshold before the electric driven hydraulic fracking system executes the fracking operation; and determine whether leaks are present in each corresponding hydraulic pump when the pressure parameter that is generated from the increase in the leak pressure applied to each corresponding hydraulic pump is increased to the pump parameter threshold.

18. The electric driven hydraulic fracking system of claim 17, wherein each controller is further configured to:
monitor the pump pressure parameter generated from the leak pressure that is applied to each corresponding hydraulic pump as the leak pressure of each corresponding hydraulic pump is increased to the pump pressure threshold, wherein the operating pressure parameter generated from the operating pressure of each corresponding hydraulic pump that is increased to the pump pressure threshold is indicative to determine whether leaks are present in each corresponding hydraulic pump;
instruct each corresponding hydraulic pump to execute a positive displacement as the pump pressure parameter generated from the leak pressure that is applied to each corresponding hydraulic pump is increased to the pump pressure threshold; and
determine whether the pump pressure parameter generated from the leak pressure that is applied to each corresponding hydraulic pump increases to a leak pump pressure threshold when each corresponding hydraulic pump executes the positive displacement, wherein the pump pressure parameter generated from the leak pressure that is applied to each corresponding hydraulic pump when each corresponding hydraulic pump executes the positive displacement increases from the pump pressure threshold to the leak pump pressure threshold is indicative of leaks are present in each corresponding hydraulic pump and the pump pressure parameter generated from the leak pressure that is applied to each corresponding hydraulic pump when each corresponding hydraulic pump executes the positive displacement does not increase from the pump pressure threshold to the leak pump pressure threshold is not indicative of leaks that are present in the hydraulic pump.

19. The electric driven hydraulic fracking system of claim 18, wherein each controller is further configured to:
monitor the pump pressure parameter generated from the leak pressure that is applied to each corresponding hydraulic pump as the leak pressure of each corresponding hydraulic pump is increased to the pump pressure threshold as each corresponding hydraulic pump executes the positive displacement;
determine whether the pump pressure parameter generated from the leak pressure that is applied to each corresponding hydraulic pump spikes at an increase from the pump pressure threshold to a pressure damage threshold as the hydraulic pump executes the positive displacement, wherein the leak pressure that is applied to each corresponding hydraulic pump that spikes at the increase from the pump pressure threshold to the pressure damage threshold as each hydraulic pump executes the positive displacement is indicative of causing damage to each corresponding hydraulic pump; and
automatically apply torque to each corresponding hydraulic pump to a torque threshold as each hydraulic pump executes the positive displacement, wherein the applying of torque to each corresponding hydraulic pump at the torque threshold enables the pump pressure parameter generated from the leak pressure that is applied to each corresponding hydraulic pump as the leak pressure of each corresponding hydraulic pump is increased to the pump pressure threshold as each corresponding hydraulic pump executes the positive displacement to decrease below the pressure damage threshold thereby preventing damage to each corresponding hydraulic pump.

20. The electric driven hydraulic fracking system of claim 19, wherein each controller is further configured to automatically apply torque to each corresponding hydraulic pump to the torque threshold to control the increase in the pump pressure parameter generated from the leak pressure that is applied to each corresponding hydraulic pump as each corresponding hydraulic pump executes the positive displacement to increase the pump pressure parameter in a linear reaction towards the pressure damage threshold and to prevent the increase in the pump pressure parameter threshold from spiking to the pressure damage threshold thereby preventing damage to each corresponding hydraulic pump.

* * * * *